(12) United States Patent
Siegel et al.

(10) Patent No.: US 8,545,950 B2
(45) Date of Patent: Oct. 1, 2013

(54) METHOD FOR DISTRIBUTING A MYOGLOBIN-CONTAINING FOOD PRODUCT

(75) Inventors: Dan G. Siegel, Belleville, IL (US); Kevin Philip Nelson, Appleton, WI (US); Gregory Robert Pockat, Ripon, WI (US); Thomas Andrew Schell, Winneconne, WI (US); Otacilio Teixeira Berbert, Oshkosh, WI (US); Ryan Arthur Michaud, Appleton, WI (US); Matthew LeRoy Mengel, Oshkosh, WI (US); Douglas Mark Latreille, Neenah, WI (US)

(73) Assignee: Curwood, Inc., Oshkosh, WI (US)

( * ) Notice: Subject to any disclaimer, the term of this patent is extended or adjusted under 35 U.S.C. 154(b) by 776 days.

(21) Appl. No.: 11/584,164

(22) Filed: Oct. 20, 2006

(65) Prior Publication Data

US 2007/0104901 A1     May 10, 2007

Related U.S. Application Data

(63) Continuation-in-part of application No. 10/576,438, filed as application No. PCT/US2005/011387 on Apr. 4, 2005, now Pat. No. 8,053,047, application No. 11/584,164, which is a continuation-in-part of application No. 11/413,504, filed on Apr. 28, 2006, now Pat. No. 7,867,531, which is a continuation-in-part of application No. PCT/US2005/011387, application No. 11/584,164, which is a continuation-in-part of application No. 11/436,159, filed on May 17, 2006, now Pat. No. 8,110,259, which is a continuation-in-part of application No. PCT/US2005/011387, application No. 11/584,164, which is a continuation-in-part of application No. 11/451,968, filed on Jun. 12, 2006, now Pat. No. 8,029,893, which is a continuation-in-part of application No. 11/413,504, and a continuation-in-part of application No. PCT/US2005/011387, application No. 11/584,164, which is a continuation-in-part of application No. 11/506,322, filed on Aug. 18, 2006, which is a continuation-in-part of application No. 11/413,504, and a continuation-in-part of application No. 11/436,159, and a continuation-in-part of application No. 11/451,968, and a continuation-in-part of application No. PCT/US2005/011387, application No. 11/584,164, which is a continuation-in-part of application No. 11/523,953, filed on Sep. 20, 2006, which is a continuation-in-part of application No. 11/413,504, and a continuation-in-part of application No. 11/436,159, and a continuation-in-part of application No. 11/451,968, and a continuation-in-part of application No. 11/506,322, and a continuation-in-part of application No. PCT/US2005/011387.

(60) Provisional application No. 60/559,350, filed on Apr. 2, 2004.

(51) Int. Cl.
*B32B 1/02* (2006.01)
*B32B 23/00* (2006.01)
*B32B 1/08* (2006.01)

(52) U.S. Cl.
USPC ....... 428/34.1; 428/34.2; 428/35.7; 428/35.9; 428/36.9

(58) Field of Classification Search
USPC .................... 428/34.1, 34.2, 35.7, 35.9, 36.9
See application file for complete search history.

(56) References Cited

U.S. PATENT DOCUMENTS

| | | | |
|---|---|---|---|
| 2,101,547 A | 12/1937 | Kistler | 99/159 |
| 2,147,261 A | 2/1939 | Lewis | 99/107 |
| 2,417,889 A | 3/1947 | Stammelman | |
| 2,528,204 A | 10/1950 | Zwosta | |
| 2,621,129 A | 12/1952 | Ramsbottom et al. | |
| 2,788,278 A | 4/1957 | Zimont et al. | |
| 2,863,777 A | 12/1958 | Dekker | |

| Patent | Date | Inventor(s) |
|---|---|---|
| 2,895,270 A | 7/1959 | Blaess |
| 2,902,369 A | 9/1959 | Komarik .......................... 99/159 |
| 2,923,632 A | 2/1960 | Castberg |
| 2,925,346 A | 2/1960 | Harper et al. |
| 2,979,410 A | 4/1961 | Parlour |
| 2,991,600 A * | 7/1961 | Lancaster ....................... 53/433 |
| 2,992,600 A | 7/1961 | Rentschler |
| 3,003,883 A | 10/1961 | Levy |
| 3,042,532 A | 7/1962 | Daline |
| 3,047,403 A | 7/1962 | McConnell |
| 3,134,678 A | 5/1964 | Wierbicki et al. |
| 3,154,423 A | 10/1964 | Voegeli et al. |
| 3,215,540 A | 11/1965 | Wierbicki et al. |
| 3,355,319 A | 11/1967 | Rees |
| 3,360,381 A | 12/1967 | Tarladgis |
| 3,361,577 A * | 1/1968 | Simon et al. .................. 426/265 |
| 3,378,379 A | 4/1968 | Shiner et al. |
| 3,384,993 A | 5/1968 | Kane |
| 3,451,827 A | 6/1969 | Bridgeford |
| 3,456,044 A | 7/1969 | Pahlke |
| 3,526,521 A | 9/1970 | Komarik |
| 3,537,864 A | 11/1970 | Magiera |
| 3,590,528 A | 7/1971 | Shepherd |
| 3,645,757 A | 2/1972 | Gordon et al. |
| 3,666,488 A | 5/1972 | Nakao et al. ..................... 99/107 |
| 3,713,849 A | 1/1973 | Grindrod et al. |
| 3,740,236 A | 6/1973 | Baxley |
| 3,741,253 A | 6/1973 | Brax et al. |
| 3,814,821 A | 6/1974 | Oliver et al. |
| 3,835,618 A | 9/1974 | Perdue |
| 3,849,241 A | 11/1974 | Butin et al. |
| 3,911,146 A | 10/1975 | Hara et al. ..................... 426/265 |
| 3,936,560 A | 2/1976 | Santurri et al. ............... 428/219 |
| 3,950,919 A | 4/1976 | Perdue |
| 3,966,045 A | 6/1976 | Perdue |
| 3,966,974 A | 6/1976 | Bharucha et al. |
| 4,001,445 A | 1/1977 | Horrocks et al. |
| 4,001,446 A | 1/1977 | Hood |
| 4,013,797 A | 3/1977 | Gryczka |
| 4,053,650 A | 10/1977 | Chino et al. |
| 4,055,672 A | 10/1977 | Hirsch et al. |
| 4,064,296 A | 12/1977 | Bornstein et al. |
| 4,089,983 A | 5/1978 | Hood |
| RE30,009 E | 5/1979 | Perdue et al. |
| 4,161,545 A | 7/1979 | Green et al. |
| 4,196,220 A | 4/1980 | Chiu et al. |
| 4,289,832 A | 9/1981 | Schwarz |
| 4,308,289 A | 12/1981 | Huisman et al. |
| 4,391,862 A | 7/1983 | Bornstein et al. |
| 4,397,891 A | 8/1983 | Kaelberer et al. |
| 4,407,897 A | 10/1983 | Farrell et al. |
| 4,416,909 A | 11/1983 | Aversano ...................... 426/265 |
| 4,420,530 A | 12/1983 | Toyoda et al. |
| 4,425,395 A | 1/1984 | Negishi et al. |
| 4,425,410 A | 1/1984 | Farrell et al. |
| 4,448,792 A | 5/1984 | Schirmer |
| 4,457,960 A | 7/1984 | Newsome |
| 4,476,112 A | 10/1984 | Aversano |
| 4,499,225 A | 2/1985 | Kubo et al. |
| 4,501,758 A | 2/1985 | Morris |
| 4,510,914 A | 4/1985 | Purser |
| 4,522,835 A | 6/1985 | Woodruff et al. |
| 4,610,914 A | 9/1986 | Newsome |
| 4,611,456 A | 9/1986 | Gillio-tos et al. |
| 4,642,239 A | 2/1987 | Ferrar et al. .................. 426/396 |
| 4,683,139 A | 7/1987 | Cheng |
| 4,728,518 A | 3/1988 | Gonzalez et al. |
| 4,737,391 A | 4/1988 | Lustig et al. |
| 4,753,809 A | 6/1988 | Webb |
| 4,755,403 A | 7/1988 | Ferguson |
| 4,755,419 A | 7/1988 | Shah |
| 4,756,914 A | 7/1988 | Jon et al. |
| 4,770,944 A | 9/1988 | Farrell et al. |
| 4,781,934 A * | 11/1988 | Shimp et al. .................. 426/264 |
| 4,792,484 A | 12/1988 | Moritani |
| 4,801,486 A | 1/1989 | Quacquarella et al. |
| 4,810,541 A | 3/1989 | Newman et al. |
| 4,818,548 A | 4/1989 | Cheng |
| 4,877,846 A | 10/1989 | Chung |
| 4,929,480 A | 5/1990 | Midkiff et al. |
| 4,929,482 A | 5/1990 | Moritani et al. |
| 4,954,526 A | 9/1990 | Keefer |
| 4,960,639 A | 10/1990 | Oda et al. |
| 4,962,728 A | 10/1990 | Highfill ........................... 119/3 |
| 4,981,707 A | 1/1991 | Morris |
| 4,990,184 A | 2/1991 | Dotson et al. |
| 5,039,705 A | 8/1991 | Keefer et al. |
| 5,047,253 A | 9/1991 | Juhl et al. |
| 5,055,328 A | 10/1991 | Evert et al. |
| 5,058,761 A | 10/1991 | Williams |
| 5,063,644 A | 11/1991 | Herrington et al. |
| 5,108,804 A | 4/1992 | Oxley et al. |
| 5,139,700 A | 8/1992 | Miksic et al. |
| 5,153,038 A | 10/1992 | Koyama et al. |
| 5,155,137 A | 10/1992 | Keefer et al. |
| 5,209,869 A | 5/1993 | Miksic et al. |
| 5,221,566 A | 6/1993 | Tokoh et al. |
| 5,223,311 A | 6/1993 | Tsutsumi et al. |
| 5,230,915 A | 7/1993 | Shahidi et al. ................. 426/240 |
| 5,256,458 A | 10/1993 | Oxley et al. |
| 5,281,471 A | 1/1994 | Diete et al. |
| 5,288,532 A | 2/1994 | Juhl et al. |
| 5,301,394 A | 4/1994 | Richardson et al. |
| 5,317,052 A | 5/1994 | Ohba et al. |
| 5,352,467 A | 10/1994 | Mitchell et al. |
| 5,374,457 A | 12/1994 | Juhl et al. |
| 5,382,391 A | 1/1995 | Juhl et al. |
| 5,382,470 A | 1/1995 | Vicik |
| 5,384,149 A | 1/1995 | Lin |
| 5,393,457 A | 2/1995 | Miksic et al. |
| 5,405,857 A | 4/1995 | Karup et al. |
| 5,407,611 A | 4/1995 | Wilhoit et al. |
| 5,416,131 A | 5/1995 | Wolff et al. |
| 5,425,956 A | 6/1995 | Shahidi et al. ................... 426/92 |
| 5,442,837 A | 8/1995 | Morgan |
| 5,443,852 A | 8/1995 | Shahidi et al. ................... 426/92 |
| 5,472,722 A | 12/1995 | Burger ........................... 426/264 |
| 5,481,852 A | 1/1996 | Mitchell ............................ 53/432 |
| RE35,285 E | 6/1996 | Quacquarella et al. |
| 5,525,357 A | 6/1996 | Keefer et al. |
| 5,558,891 A | 9/1996 | Lawless et al. |
| 5,573,797 A | 11/1996 | Wilhoit |
| 5,573,800 A | 11/1996 | Wilhoit |
| 5,573,801 A | 11/1996 | Wilhoit |
| 5,591,468 A | 1/1997 | Stockley, III et al. |
| 5,593,747 A | 1/1997 | Georgelos |
| 5,597,599 A | 1/1997 | Smith et al. |
| 5,663,002 A | 9/1997 | Schirmer |
| 5,667,827 A | 9/1997 | Breen et al. .................... 426/129 |
| 5,711,978 A | 1/1998 | Breen et al. .................... 426/129 |
| 5,715,945 A | 2/1998 | Chandler |
| 5,759,648 A | 6/1998 | Idlas |
| 5,759,650 A | 6/1998 | Raines et al. |
| 5,770,645 A | 6/1998 | Stamler et al. |
| 5,800,412 A | 9/1998 | Zhang et al. |
| 5,834,077 A | 11/1998 | Babrowicz |
| 5,834,098 A | 11/1998 | Kitamura et al. |
| 5,840,381 A | 11/1998 | Ohtsuka |
| 5,845,769 A | 12/1998 | Yeager |
| 5,846,582 A | 12/1998 | Mayfield et al. |
| 5,855,975 A | 1/1999 | Miksic et al. |
| 5,866,184 A | 2/1999 | Gorlich et al. |
| 5,888,528 A | 3/1999 | Wellinghoff et al. |
| 5,894,040 A | 4/1999 | Foley et al. |
| 5,895,587 A | 4/1999 | Sorensen |
| 5,916,613 A | 6/1999 | Stockley |
| 5,928,770 A | 7/1999 | Quinones |
| 5,937,618 A | 8/1999 | Chandler |
| 5,958,805 A | 9/1999 | Quinones |
| 5,964,532 A | 10/1999 | Phillips et al. |
| 5,965,264 A | 10/1999 | Barenberg et al. |
| 5,989,610 A | 11/1999 | Ruzek ........................... 426/281 |
| 5,989,613 A | 11/1999 | Buchko |
| 5,994,444 A | 11/1999 | Trescony et al. |
| 6,020,012 A | 2/2000 | Kauffman et al. |
| 6,028,160 A | 2/2000 | Chandler et al. |
| 6,033,599 A | 3/2000 | Lozano et al. |
| 6,033,705 A | 3/2000 | Isaacs |

| | | |
|---|---|---|
| 6,042,859 A | 3/2000 | Shaklai |
| 6,046,243 A | 4/2000 | Wellinghoff et al. |
| 6,068,933 A | 5/2000 | Shepard et al. |
| 6,074,715 A | 6/2000 | Lind et al. |
| 6,087,479 A | 7/2000 | Stamler et al. |
| 6,099,881 A | 8/2000 | Hanson .................... 426/263 |
| 6,113,962 A | 9/2000 | Spencer .................... 426/316 |
| 6,143,344 A | 11/2000 | Jon et al. |
| 6,204,223 B1 | 3/2001 | Holmes et al. |
| 6,210,725 B1 | 4/2001 | Colombo |
| 6,221,470 B1 | 4/2001 | Ciocca et al. |
| RE37,171 E | 5/2001 | Busche et al. |
| 6,232,434 B1 | 5/2001 | Stamler et al. |
| 6,242,371 B1 | 6/2001 | Quinones |
| 6,270,829 B1 | 8/2001 | Shaklai |
| 6,270,873 B1 | 8/2001 | Darnett |
| 6,287,613 B1 | 9/2001 | Childress et al. |
| 6,299,984 B1 | 10/2001 | Forloni |
| 6,316,067 B1 | 11/2001 | Edwards et al. |
| 6,403,759 B2 | 6/2002 | Stamler et al. |
| 6,409,384 B1 | 6/2002 | Provan et al. |
| 6,420,470 B1 | 7/2002 | Miksic et al. |
| 6,439,770 B2 | 8/2002 | Catchman |
| 6,447,826 B1 | 9/2002 | Matthews .................... 426/126 |
| 6,465,109 B2 | 10/2002 | Ohtsuka |
| 6,500,473 B1 | 12/2002 | Koehler et al. |
| 6,511,568 B1 | 1/2003 | Eckstein et al. |
| 6,514,583 B1 | 2/2003 | Ahlgren et al. |
| 6,521,275 B1 | 2/2003 | Mercogliano et al. |
| 6,524,002 B2 | 2/2003 | Tomic |
| 6,527,444 B1 | 3/2003 | Buchman |
| 6,533,962 B1 | 3/2003 | Tulka et al. |
| 6,562,476 B2 | 5/2003 | Shepard et al. |
| 6,565,985 B2 | 5/2003 | Ueyama et al. |
| 6,592,919 B1 | 7/2003 | Matthews et al. |
| 6,602,466 B2 | 8/2003 | Hamilton et al. |
| 6,609,827 B2 | 8/2003 | Bois et al. |
| 6,610,392 B1 | 8/2003 | Ramesh et al. |
| 6,616,333 B2 | 9/2003 | Kinigakis et al. |
| 6,617,041 B2 | 9/2003 | Hahn et al. |
| 6,623,773 B2 * | 9/2003 | Meier et al. .................... 426/132 |
| 6,632,021 B2 | 10/2003 | Bois et al. |
| 6,632,785 B2 | 10/2003 | Pfeiffer et al. |
| 6,651,874 B1 | 11/2003 | Pedersen |
| 6,663,283 B1 | 12/2003 | Cappel |
| 6,666,580 B2 | 12/2003 | Bois |
| 6,667,082 B2 | 12/2003 | Bamore et al. |
| 6,673,465 B2 | 1/2004 | Lordi |
| 6,673,891 B2 | 1/2004 | Stamler et al. |
| 6,682,825 B1 | 1/2004 | Kennedy et al. |
| 6,689,403 B1 | 2/2004 | Gehring et al. |
| 6,689,460 B2 | 2/2004 | Wen et al. |
| 6,699,549 B1 | 3/2004 | Ueyama et al. |
| 6,706,274 B2 | 3/2004 | Herrmann et al. |
| 6,716,464 B1 | 4/2004 | Schlegel et al. ................ 426/312 |
| 6,749,910 B1 | 6/2004 | Georgelos et al. |
| 6,753,054 B1 | 6/2004 | Lind et al. |
| 6,773,820 B1 | 8/2004 | Wilhoit et al. |
| 6,777,046 B1 | 8/2004 | Tatarka et al. |
| 6,815,023 B1 | 11/2004 | Tatarka et al. |
| 6,858,275 B2 | 2/2005 | Ferri et al. |
| 6,861,125 B1 | 3/2005 | Carlson et al. |
| 6,861,127 B2 | 3/2005 | Glawe et al. |
| 6,869,686 B1 | 3/2005 | Idlas |
| 6,875,840 B2 | 4/2005 | Stamler et al. |
| 6,879,027 B2 | 4/2005 | Sato |
| 6,881,430 B2 | 4/2005 | Køhler et al. |
| 6,887,994 B2 | 5/2005 | Stamler et al. |
| 6,939,569 B1 | 9/2005 | Green et al. |
| 6,942,909 B2 | 9/2005 | Shirrell et al. |
| 6,942,927 B2 | 9/2005 | Shepard et al. |
| 6,945,402 B1 | 9/2005 | Gueret |
| 6,964,816 B2 | 11/2005 | Schell et al. |
| 7,017,774 B2 | 3/2006 | Haedt |
| 7,018,719 B2 | 3/2006 | Ueyama et al. |
| 7,037,543 B2 | 5/2006 | Sandusky et al. ............ 426/129 |
| 7,335,327 B2 | 2/2008 | Grah et al. |
| 7,422,923 B2 | 9/2008 | Kojima et al. |
| 8,087,479 B2 | 1/2012 | Kulkarni et al. |
| 2001/0055640 A1 | 12/2001 | Meier et al. |
| 2002/0051754 A1 | 5/2002 | Schroeder et al. |
| 2002/0097923 A1 | 7/2002 | Dobreski et al. |
| 2002/0102405 A1 | 8/2002 | Chapman et al. |
| 2002/0119220 A1 | 8/2002 | Costello |
| 2002/0172834 A1 * | 11/2002 | Rivett et al. .................... 428/515 |
| 2002/0196987 A1 | 12/2002 | Tilman et al. |
| 2002/0197467 A1 | 12/2002 | Johnson |
| 2003/0017194 A1 | 1/2003 | Joerger et al. |
| 2003/0039724 A1 | 2/2003 | DuCharme et al. ........... 426/135 |
| 2003/0044492 A1 | 3/2003 | Knigge et al. |
| 2003/0203081 A1 | 10/2003 | Saari et al. |
| 2003/0235664 A1 | 12/2003 | Merical et al. |
| 2004/0009273 A1 | 1/2004 | Shaklai |
| 2004/0039683 A1 | 2/2004 | Mcgeorge |
| 2004/0076845 A1 | 4/2004 | Albright |
| 2004/0097630 A1 | 5/2004 | Whiteman et al. |
| 2004/0131805 A1 | 7/2004 | Merical et al. |
| 2004/0137202 A1 | 7/2004 | Hamilton et al. |
| 2004/0151853 A1 | 8/2004 | Shirrell et al. |
| 2004/0166262 A1 | 8/2004 | Busche et al. |
| 2005/0011387 A1 | 1/2005 | Schneider et al. |
| 2005/0019537 A1 | 1/2005 | Nakaishi et al. |
| 2005/0059655 A1 | 3/2005 | Garvey et al. |
| 2005/0084636 A1 | 4/2005 | Papenfus et al. |
| 2005/0089607 A1 | 4/2005 | Numata et al. |
| 2005/0106380 A1 | 5/2005 | Gray et al. |
| 2005/0129969 A1 | 6/2005 | Schell et al. |
| 2005/0249848 A1 | 11/2005 | Charest et al. |
| 2005/0254731 A1 | 11/2005 | Berbert et al. |
| 2006/0233985 A1 | 10/2006 | Pockat et al. |
| 2006/0246242 A1 | 11/2006 | Siegel et al. |
| 2006/0286323 A1 | 12/2006 | Siegel et al. |
| 2007/0014947 A1 | 1/2007 | Mengel et al. |
| 2007/0014953 A1 | 1/2007 | Siegel et al. |
| 2007/0246867 A1 | 10/2007 | Nelson et al. |

FOREIGN PATENT DOCUMENTS

| | | |
|---|---|---|
| CA | 857827 | 12/1970 |
| CA | 878423 | 8/1971 |
| CA | 905744 | 7/1972 |
| CA | 1053497 | 5/1979 |
| CA | 1329890 | 5/1994 |
| CA | 2007522 | 3/2000 |
| CA | 2230614 | 4/2001 |
| CA | 2100074 | 8/2003 |
| CA | 2500860 | 12/2009 |
| DE | 2 363 258 A1 | 7/1974 |
| DE | 2 415 659 A1 | 10/1974 |
| DE | 24 51 337 A1 | 8/1975 |
| EP | 0 013 556 A1 | 7/1980 |
| EP | 0 172 432 A2 | 2/1986 |
| EP | 0 202 771 A2 | 11/1986 |
| EP | 0120503 | 4/1987 |
| EP | 0 224 990 A1 | 6/1987 |
| EP | 0 364 624 A1 | 4/1990 |
| EP | 0 491 164 A2 | 6/1992 |
| EP | 0 473 091 B1 | 12/1995 |
| EP | 0 662 527 B1 | 5/1997 |
| EP | 1 138 478 A2 | 4/2001 |
| EP | 0 788 319 B1 | 4/2002 |
| FR | 2 634 976 | 2/1990 |
| GB | 1 048 770 | 11/1966 |
| GB | 1 253 449 A | 11/1971 |
| GB | 1 475 994 A | 6/1977 |
| GB | 2 187 081 A | 9/1987 |
| JP | 57155975 | 9/1982 |
| JP | 57-170175 A2 | 10/1982 |
| JP | 57-170176 A2 | 10/1982 |
| JP | 58073064 | 5/1983 |
| JP | 58-101670 | 6/1983 |
| JP | 59-085278 A | 5/1984 |
| JP | 59178273 | 10/1984 |
| JP | 64-071437 | 3/1989 |
| JP | 01210340 A | 8/1989 |
| JP | 04-318033 | 11/1992 |
| JP | 05-140344 | 6/1993 |
| JP | 06-049247 A | 2/1994 |
| JP | 06049247 A | 2/1994 |

| | | |
|---|---|---|
| JP | 07-258467 | 10/1995 |
| JP | 10313821 | 12/1998 |
| JP | 2000015737 A | 1/2000 |
| JP | 2000141535 A | 5/2000 |
| JP | 2001258468 | 9/2001 |
| JP | 2002125621 | 5/2002 |
| JP | 2003191420 A | 7/2003 |
| JP | 4066071 | 1/2008 |
| JP | 5140344 | 11/2012 |
| WO | WO 92/15454 A1 | 9/1992 |
| WO | WO 96/14760 A1 | 5/1995 |
| WO | WO 99/23143 A1 | 5/1999 |
| WO | WO 00/69775 A1 | 11/2000 |
| WO | WO 02/056904 A1 | 7/2002 |
| WO | WO 03009709 | 2/2003 |
| WO | WO 2004/000541 A1 | 12/2003 |
| WO | 2004039683 A1 | 5/2004 |
| WO | WO 2004039683 | 5/2004 |
| WO | 2005097486 A1 | 10/2005 |
| WO | WO 2005097486 | 10/2005 |

OTHER PUBLICATIONS

Sacharow, S.; Griffin, R.C.; Food Packaging; AVI Publishing: Westport, CT, 1970; "Red Meats," pp. 95-119.

McGee, H.; *On Food and Cooking: The Science and Lore of the Kitchen*, Scribner: New York, 1984, Chapter 3, "Meat" pp. 118-178.

Grayson, M.; *Kirk-Othmer Encyclopedia of Chemical Technology*, $3^{rd}$ ed.; John Wiley & Sons: New York, 1981, vol. 15, "Meat Products", pp. 62-74.

Grayson, M.; *Kirk-Othmer Encyclopedia of Chemical Technology*, $3^{rd}$ ed.; John Wiley & Sons: New York, 1981, vol. 11, "Food Additives", pp. 146-163.

Grayson, M.; *Kirk-Othmer Encyclopedia of Chemical Technology*, 3rd ed.; John Wiley & Sons: New York, 1981, vol. 11, "Food Processing", pp. 164-183.

Kroschwitz, J. I.; *Encyclopedia of Polymer Science and Technology*, Wiley Interscience: New Jersey, 2003, vol. 3, "Packaging, Flexible," pp. 353-363.

Kroschwitz, J. I.; *Encyclopedia of Polymer Science and Technology*, Wiley Interscience: New Jersey, 2003, vol. 2, Coextrusion pp. 1-25.

Brody, A. L.; Marsh, K. S.; *The Wiley Encyclopedia of Packaging Technology*, $2^{nd}$ ed.; John Wiley & Sons: 1997, Active Packaging, pp. 2-13.

Brody, A. L.; Marsh, K. S.; *The Wiley Encyclopedia of Packaging Technology*, 2nd ed.; John Wiley & Sons: 1997, Coextrusions for Flexible Packaging, pp. 237-240.

Brody, A. L.; Marsh, K. S.; *The Wiley Encyclopedia of Packaging Technology*, $2^{nd}$ ed.; John Wiley & Sons: 1997, Form/Fill/Seal, Horizontal & Form/Fill/Seal, Vertical, pp. 465-470.

Brody, A. L.; Marsh, K. S.; *The Wiley Encyclopedia of Packaging Technology*, $2^{nd}$ ed.; John Wiley & Sons: 1997, Packaging of Food, pp. 699-704.

Brody, A. L.; Marsh, K. S.; *The Wiley Encyclopedia of Packaging Technology*, $2^{nd}$ ed.; John Wiley & Sons: 1997, Thermoform/Fill/Seal, pp. 910-921.

Brody, A. L.; Marsh, K. S.; *The Wiley Encyclopedia of Packaging Technology*, $2^{nd}$ ed.; John Wiley & Sons: 1997, Trays, Barrier-Foam, pp. 931-937.

Brody, A. L.; Marsh, K. S.; *The Wiley Encyclopedia of Packaging Technology*, $2^{nd}$ ed.; John Wiley & Sons: 1997, Vacuum Packaging, pp. 949-955.

Wang, P. G.; Cai, T. B.; Taniguchi, N.; *Nitric Oxide Donors*; Wiley-VCH: 2005, Chapter 1, "NO and NO Donors", pp. 3-31.

Han, J. H.; "Antimicrobial Food Packaging", in *Food Technology*, Mar. 2000, vol. 54, No. 3, pp. 56-65.

Hampe, D.; Piringer, O., "Studies on the permeation of inorganic salts through plastic films", in *Food Additives and Contaminants*, 1998, vol. 15, No. 2, pp. 209-216.

Vartianinen, J., Skytta, Enqvist, J., Ahvenainen, R., "Properties of Antimicrobial Plastics Containing Traditional Food Preservatives", in *Packaging Technology and Science*, 2003, 16, pp. 223-229.

Gasco, A.; Fruttero, R.; Sorba, G.; Di Stilo, A.; and Calvino, R., "NO donors: Focus on Furoxans Derivatives", in *Pure Appl. Chem.*, 2004, vol. 76, No. 5, pp. 973-981.

Wang, P. G.; Xian, M.; Tang, X.; Wu, X.; Wen, Z.; Cai, T.; and Janczuk, A. J., „Nitric Oxide Donors: Chemical Activities and Biological Applications, *Chem. Rev.*, 2002, 102, pp. 1091-1134.

Toyer, L.; Salafranca, J.; Sanchez, C.; and Nerin, C., "Migration Studies to Assess the Safety in Use of a New Antioxidant Active Packaging", *J. Agric. Food Chem.*, 2005, 53, pp. 5270-5275.

"Migration of Toxicants, Flavors, and Odor-Active Substances from Flexible Packaging Materials to Food", *Food Technology*, Jul. 1988, pp. 95-102.

"Nitrate, Nitrite, and Nitroso Compounds in Foods", *Food Technology*, Apr. 1987, pp. 127-136.

Heaton, K.M., Corformth, D.P., Moiseev, I.V., Egbert, W.R., Carpenter, C.E. "Minimum Sodium Nitrite Levels for pinking of various cooked meats as related to use of direct or indirect-dried soy isolates in poultry rolls", *Meat Science*, 2000, 55, pp. 321-329.

Bureau, G.; Multon, J.L.; *Food Packaging Technology*, vol. 2, 1996, "Influence of the Absence of Oxygen on the Color of the Meat", pp. 239-242.

Kramlich, W.E.; Pearson, A.M.; Tauber, F.W., *Processed Meats*, The AVI Publishing Company, Inc., 1973, Chapter 1, "Introduction to Meat Processing", pp. 1-12.

Kramlich, W.E.; Pearson, A.M.; Tauber, F.W., *Processed Meats*, The AVI Publishing Company, Inc., 1973, Chapter 3, "Curing", pp. 40-60.

Meat & Deli Retailer, Mar. 2005, pp. 1-19.

Meat & Deli Retailer, Mar. 2005, pp. 22-46.

Gregerson, J.; *Meat Marketing & Technology*, Dec. 2005, "Seeing Red", p. 4.

Hisey, P.; *Meat Marketing & Technology*, Mar. 2005, "Open and shut case?", pp. 20-30.

Salvage, B.; *The National Provisioner*, Jun. 2005, "Case-ready penetration", pp. 96-105.

Schwarz, S. J.; Claus, J.R.; Wang, H.; Marriott, N.G..; Graham, P.P; Fernandes, C.F., "Inhibition of Pink Color Development in Cooked, Uncured Turkey Breast Through Ingredient Incorporation" in *Poultry Science* 1999, vol. 78, pp. 255-266.

Dymicky, M.; Fox, J.B.; Wasserm, A. E., Color Formation in Cooked Model and Meat Systems With Organic and Inorganic Compounds, in *J. Food Science* 1975, vol. 4, pp. 306-309.

Pegg, R. B.; Nitrite Curing of Meat: The N-Nitrosamine Problem and Nitrite Alternatives; in *Food & Nutrition*, Chapter 9, "Possible Substitutes for Nitrite", pp. 209-223, Dec. 2004.

USDA, 1995. Processing Inspector's Calculations Handbook (FSIS Directive 7620.3), http://fsis.usda.gov/OPPDE/rdad?FSISDirectives/7620-3.pdf. Accessed Sep. 1, 2009.

Sebranek, J. and J. Bacus, Natural and Organic Meat Products: Regulatory, Manufacturing, Marketing, Quality and Safety Issues. American Meat Science Assoc. White Paper, 2007.

McMillin, K.W. et al; "Quality and Shelf-Life of Meat in Case-Ready Modidfied Atmosphere Packaging"; Quality Attributes of Muscle Foods; 1999; Plenum Publishers, New York.

Renerre, M. "Review: Factors involved in the discoloration of beef meat"; International Journal of Food Science & Technology; 1990; 25, pp. 613-630.

Summel, Lauren M.; "Chapter :II: Review of the Literature—Myoglobin": Ph.D. Thesis, Kansas State University; 2004.

Rizvi, Syed S. H.; "Requirements for Foods Packaged in Polymeric Films"; CRC Critical Reviews in Food Science & Nutrition; Feb. 1981; pp. 111-133.

Faustman, C. et al.; "The Biochemical Basis for Discoloration in Fresh Meat: A review"; Journal of Muscle Foods; Food & Nutrition Press, Inc.; 1990; pp. 217-233.

"The Eating Quality of Meat"; Meat Science; Pergamon Press; 5th Ed.; 1991; pp. 184-187.

Govindarajan, S.; "Fresh Meat Color"; CRC Critical Reviews in Food Technology; Sep. 1973; pp. 117-127.

Giddings, G.G.; "Symposium: The Basis of quality in Muscle Foods—The Basis of Color in Muscle Foods"; Journal of Food Science; vol. 42, No. 2; 1997; pp. 288-294.

Maddock, R.; "Color Counts"; Operations & Technology; Oct. 2004; pp. 63-65.

Hermansen, P.; "Comparison of Modifed Atmosphere Versus Vacuum Packaging to Extend the Shelf Life of Retail Fresh Meat Cuts"; Reciprocal Meat Conference Proceedings; V25,'83.
Holland, G.C.; "Modified Atmospheres for Fresh Meat Distribution"; Meat Science; vol. 13(19); 1985; pp. 21-39.
Sebranek, Dr. J.G.; "'Meat is dynamic'—factors in controlled atmosphere packs"; The National Provisioner; May 10, 1986; pp. 10-16.
Kropf, D.; "Enhancing Meat Color Stability"; 56th Annual Reciprocal Meat Conference; Jun. 15-18, 2003; pp. 73-75.
Thippareddi, H. et al.; "Modified Atmosphere Packaging (MAP): Microbial Control & Quality"; FACTS National Pork Board; #04667; Oct. 2002; pp. 1-8.
Kropf, D.; "Meat Display Lighting"; FACTS National Pork Board; #04623; Feb. 2002; pp. 1-8.
Hunt, M. et al.; "Cooked Color in Pork"; FACTS National Pork Board; #01637; Mar. 2002; pp. 1-4.
Atkinson, J.L. et al.; "Biochemical studies on the discoloration of fresh meat"; Journal of Food Technology; vol. 8, pp. 51-58; 1973.

* cited by examiner

*Primary Examiner* — Marc Patterson
(74) *Attorney, Agent, or Firm* — Christine E. Parsons

(57) ABSTRACT

A method of distributing or commercializing fresh meat having the general steps of butchering a slaughtered animal into a plurality of retail cuts; packaging the retail cuts into a plurality of articles wherein each article comprises a polymeric oxygen barrier film having a transparent portion in contact with at least a portion of the fresh meat product; transporting the packaged article to a retail outlet, wherein the packaged article is adapted for retail display and sale without removing the polymeric film and wherein the fresh meat product has a desirable appearance especially a desirable red color e.g. having an "a*" value of at least about 15 for the fresh beef product or of at least about 6 for a fresh pork or fresh poultry product and the color is maintained for at least five days and up to four weeks or more after display.

19 Claims, 3 Drawing Sheets

METHOD FOR DISTRIBUTING A MYOGLOBIN-CONTAINING FOOD PRODUCT

CROSS-REFERENCE TO RELATED APPLICATIONS

This application is a continuation-in-part of the following applications:

U.S. patent application Ser. No. 10/576,438, filed Apr. 20, 2006, titled "Improved Packaging Method that Causes and Maintains the Preferred Red Color of Fresh Meat," which is a National Stage of International Patent Application No. PCT/US2005/11387, filed Apr. 4, 2005, which claims the benefit of U.S. Provisional Application No. 60/559,350, filed Apr, 2, 2004;

U.S. patent application Ser. No. 11/413,504, filed Apr. 28, 2006, titled "Myoglobin Blooming Agent Containing Shrink Films, Packages and Methods for Packaging," which is a continuation-in-part of International Patent Application No. PCT/US2005/011387, filed Apr. 4, 2005, which claims the benefit of U.S. Provisional Application No. 60/559,350, filed Apr. 2, 2004;

U.S. patent application Ser. No. 11/436,159, filed May 17, 2006, titled "Packaging Articles, Films and Methods that Promote or Preserve the Desirable Color of Meat," which is a continuation-in-part of International Patent Application No. PCT/US2005/011387, filed Apr. 4, 2005, which claims the benefit of U.S. Provisional Application No. 60/559,350, filed Apr. 2, 2004;

U.S. patent application Ser. No. 11/451,968, filed Jun. 12, 2006, titled "Myoglobin Blooming Agent, Films, Packages and Methods for Packaging", which is a continuation-in-part of U.S. patent application Ser. No. 11/413,504, filed Apr. 28, 2006 and a continuation-in-part of International Patent Application No. PCT/US2005/011387, filed Apr. 4, 2005, which claims the benefit of U.S. Provisional Application No. 60/559,350, filed Apr. 2, 2004;

U.S. patent application Ser. No. 11/506,322, filed Aug. 18, 2006, titled "Webs With Synergists That Promote or Preserve the Desirable Color of Meat," which is a continuation-in-part of U.S. patent application Ser. No. 11/413,504, filed Apr. 28, 2006 and a continuation-in-part of U.S. patent application Ser. No. 11/436,159, filed May 17, 2006 and a continuation-in-part of U.S. patent application Ser. No. 11/451,968, filed Jun. 12, 2006 and a continuation-in-part of International Patent Application No. PCT/US2005/011387, filed Apr. 4, 2005, which claims the benefit of U.S. Provisional Application No. 60/559,350, filed Apr. 2, 2004;

U.S. patent application Ser. No. 11/523,953, filed Sep. 20, 2006, titled "Packaging Inserts with Myoglobin Blooming Agents, Packages and Methods of Packaging," which is a continuation-in-part of U.S. patent application Ser. No. 11/413,504, filed Apr. 28, 2006 and a continuation-in-part of U.S. patent application Ser. No. 11/436,159, filed May 17, 2006 and a continuation-in-part of U.S. patent application Ser. No. 11/451,968, filed Jun. 12, 2006 and a continuation-in-part of U.S. patent application Ser. No. 11/506,322, filed Aug. 18, 2006 and a continuation-in-part of International Patent Application No. PCT/US2005/011387, filed Apr. 4, 2005, which claims the benefit of U.S. Provisional Application No. 60/559,350, filed Apr. 2, 2004.

All of the above applications (U.S. patent application Ser. Nos. 10/576,438, 11/413,504, 11/436,159, 11/451,968, 11/506,322 and 11/523,953; International Patent Application No. PCT/US2005/11387; and U.S. Provisional Application No. 60/559,350) are incorporated herein in their entirety by reference.

BACKGROUND OF THE INVENTION

The present disclosure relates to a method of distributing or commercializing a myoglobin-containing food product.

Meat appearance including color is an important quality characteristic of packaged meat products that affects their merchantability. Product packaging that preserves a desirable appearance and color of fresh meat can promote the merchantability and appeal of meat. Consumers often use color as an indicator of meat quality and freshness. Lighter colored meat is often easier to see than dark colored meat allowing a consumer to more easily differentiate meat surface characteriastics such as texture and marbling. The color of meat is related to the amount and chemical state of myoglobin in the meat. Myoglobin is present in the muscle tissue of all animals and functions to store and deliver oxygen by reversibly binding molecular oxygen, thereby creating an intracellular source of oxygen for the mitochondria. Pork and poultry typically contain lower amounts of myoglobin than beef and thus are lighter in color than beef.

Myoglobin includes an open binding site called heme that can bind certain small molecules, such as molecular oxygen ($O_2$ or "oxygen") or water. The presence and type of ligand bound at the myoglobin binding site can alter the color of the myoglobin. The color of the meat product will change based on the amount of myoglobin present and the amount and type(s) of ligand molecule(s) bound to the heme binding site. Myoglobin without a molecule bound to the heme site is a purple colored molecule called deoxymyoglobin. Molecular oxygen readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. When a water molecule binds to the heme group, the myoglobin molecule turns brown and is referred to as metmyoglobin. The binding of carbon monoxide (CO) can cause a red color similar to that produced by oxygen binding. Nitric oxide (NO) has been described as forming a stable pink color in cured meat.

Prior to the 1960's, animal carcasses were shipped to retailers for dividing into retail-sized portions of meat. In the 1960's, the meat industry went through a revolutionary change when the slaughterer began vacuum packaging smaller pieces of meat (referred to as "primals" and "subprimals") and placing them in boxes for shipping long distances to the retailer. This permitted centralizing slaughter operations. Shipping cattle to stockyards near large cities was rendered obsolete (the famous Chicago stockyards were closed in 1971). Stockyards near cities were no longer required and the need to ship live cattle long distances was greatly reduced. The retailer then prepared and packaged the fresh meat products as they were sold to consumers at the site of final sale. Such boxed meat had economic advantages: Freight for shipping bones and fat to the retailer and back to the slaughterer was eliminated; labor became more efficient under the production oriented atmosphere of the slaughterer; drip losses from aging and shipping whole carcasses were reduced; and product protection, sanitation and shelf life were improved. These advantages more than offset the additional costs of packaging. This method of shipping boxed meat from the slaughterer to the retailer for the retailer to prepare and package for the consumer still continues in some forms today.

However, the practice of boxing meat and shipping to the retailer may inadequately preserve favorable meat color. The conventional packaging format used by the retail grocer for fresh meat involves stretching a thin plastic film around a foam tray supporting the product. The film is permeable to oxygen so that the color of the meat quickly blooms to a bright red. However, once packaged, meat has a display-case life of only a few days, as the red color of the oxymyoglobin becomes the brown color of the metmyoglobin within approximately three days. Thus, the color often becomes unacceptable before the packaged meat is sold even though the meat remains nutritious, tasty and healthy for consumption. The unacceptability of the color results in meat not being sold and in unnecessary wastes of meat, packaging materials and slaughtered animals.

As a result, packaging formats that promote and maintain fresh meat color for a longer period of time are needed for centralized packaging operations. One attempted approach is to package meat in oxygen barrier, vacuum bags. These bags are vacuum sealed and prevent oxygen contact with the meat until the package is opened. Vacuum sealed meat products are nutritious, healthy, have a long shelf life and are less prone to freezer burn. However, they also may have an undesirable purple meat color that does not bloom to a desirable red color until the meat is exposed to air. Consumer acceptance of meat having a purple color is less than that of meat having a red color. In the mid-1980's, Excel Corporation and The Kroger Company developed a program to market a flexible vacuum package of Excel's case-ready beef cuts. The vacuum package resulted in a purple meat color. The program failed because the majority of consumers would not accept the purple color.

To provide meat with the consumer preferred red color, meat has also been packaged in a case-ready, modified atmosphere package ("MAP"). Case-ready meat products can be generally defined as fresh meat that is prepackaged and optionally prelabeled at a centralized location and delivered to the retail market prepared for final sale. Increasingly, meat products such as ground beef, turkey and chicken products delivered to U.S. domestic supermarkets for retail sale are delivered in case-ready packaging. For many supermarkets, especially so-called "mega-grocery stores," case-ready meat products provide not only cost savings in terms of minimizing or eliminating on-site butchering and packaging, but also increased sanitation and decreased incidence of product spoilage. The case-ready meat product preferably provides a predetermined weight and/or volume of a common meat product, such as chicken breast and ground beef. The meat product may be provided fresh, frozen, hard chilled, thawed, enhanced, processed or cooked.

In a case-ready, MAP, the meat is maintained in a sealed pocket containing an atmosphere that is different than ambient air. Various combinations or oxygen, nitrogen and carbon dioxide may be flushed into the package. For example, one such commercially acceptable MAP contains an atmosphere enriched with oxygen (up to 80% by volume) to better maintain a preferred red color. Another case ready MAP maintains meat in carbon dioxide, with very low oxygen content until just before display when the meat is exposed to oxygen to cause blooming to the desired red color. Alternatively, the meat can be contacted with a MAP having an atmosphere containing a small concentration of carbon monoxide (CO) (e.g., 0.4% by volume) to maintain a preferred red meat color. However, while CO-containing MAP may maintain a shelf life comparable to vacuum packaged meat, the red color developed by CO tends to extend through a significant portion of the meat product, causing a permanent "pinking" of the interior of the meat which may remain even after the meat has been fully cooked. The bright red CO-myoglobin complex is referred to as carboxymyoglobin. The presence of carbon monoxide can also disfavorably impact sales of CO-containing MAP packages among consumers.

MAP also requires a headspace for contact of the modified atmosphere with the meat surface to affect the desired color over time. This requirement for a headspace leads to increased package volume, transportation costs and storage requirements and also limits the display appearance by making the product less visible due to the high side walls of the container and the gap between the film and the meat surface.

Nitrite or nitrate salts, such as sodium nitrite, are often used in curing meat, and can also affect meat color. Nitrate and nitrite additives are generally recognized as safe for use in foods, and are commonly known preservatives used in the curing process for products such as hams, lunchmeat, bologna and hot dogs. Nitrite and nitrates are used to cure and disinfect meats in the meat industry often producing a stable pink to red color in the process. For example, GB 2187081A discloses immersion of meat in an aqueous solution of sodium chloride, polyphosphate ions and nitrite ions to preserve meat. See also McGee, *On Food and Cooking*, Rev. Ed., 2004, "Meat," Chapter 3, pp. 118-178 (Scribner, New York, N.Y.) which is hereby incorporated by reference. The presence of oxygen can oxidize available nitric oxide to nitrite thus reducing its availability to associate with the myoglobin molecule.

Packaging films have been described that comprise nitrite or nitrate compounds as a desiccant, a food preservative or as a volatile corrosion inhibitor for packaging of metal products. Anti-fungal agents including food preservatives such as sodium nitrite may be applied on various types of packaging to preserve biodegradable packaging against premature deleterious attack by fungi, as disclosed in JP7-258467A. Oxygen barrier films for packaging food products can contain a nitrate salt as a moisture-absorbing agent within an EVOH barrier material or other layer of a multilayer film, as disclosed in JP5-140344A, and U.S. Pat. No. 4,407,897 (Farrell et al.); U.S. Pat. No. 4,425,410 (Farrell et al.); U.S. Pat. No. 4,792,484 (Moritani); U.S. Pat. No. 4,929,482 (Moritani et al.); U.S. Pat. No. 4,960,639 (Oda et al.), and U.S. Pat. No. 5,153,038 (Koyama et al.). Nitrate or nitrite products have also been described as being included in packaging films to absorb moisture, e.g., to inhibit corrosion of metal products, as disclosed in U.S. Pat. No. 2,895,270 (Blaess); U.S. Pat. No. 5,715,945 (Chandler); U.S. Pat. No. 5,894,040 (Foley et al.); U.S. Pat. No. 5,937,618 (Chandler); U.S. Pat. No. 6,465,109 (Ohtsuka), and U.S. Pat. No. 6,942,909 (Shirrell et al.), U.S. Published Patent Application No. 2005/0019537 (Nakaishi et al.), GB Patent No. 1,048,770 (Canadian Technical Tape, Ltd.), and EP Patent Nos. EP 0 202 771 B1 (Aicello Chemical Co. Ltd.), and EP 0 662 527 B1 (Cortec Corp.) and EP 1 138 478 A2 (Aicello Chemical Co. Ltd.). None of these barrier films teach a food-contact portion comprising a nitrite or nitrate material adapted to maintain a desirable appearance of a myoglobin-containing food product.

Current methods of distributing or commercializing myoglobin-containing food products such as fresh meat include many disadvantages in their attempts to maintain a desirable appearance of the food product. What is needed is a new method of distributing such food products, such as methods allowing for a food packaging article to contact a portion of the food product while still achieving a desirable appearance of the surface of the food product for a longer display-life.

BRIEF SUMMARY OF THE INVENTION

A method of distributing or commercializing fresh meat having the general steps of butchering a slaughtered animal into a plurality of retail cuts; packaging the retail cuts into a plurality of articles wherein each article comprises a polymeric oxygen barrier film having a transparent portion in contact with at least a portion of the fresh meat product; transporting the packaged article to a retail outlet, wherein the packaged article is adapted for retail display and sale e.g. without removing the polymeric film and wherein the fresh meat product has a desirable appearance especially a desirable red color e.g. having an "a*" value of at least about 15 for the fresh beef product or of at least about 6 for a fresh pork or fresh poultry product and the color is maintained for at least five days and up to four weeks or more after display.

DETAILED DESCRIPTION OF THE INVENTION

Figure 1:
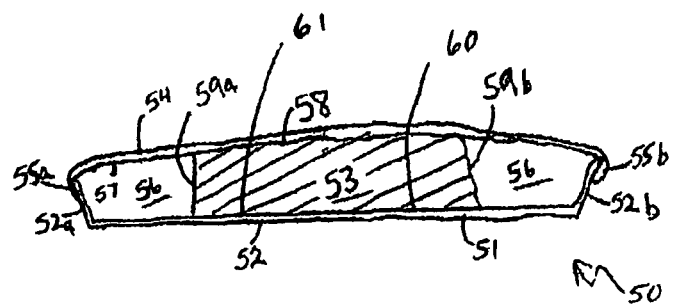
FIG. 1 shows a cross-sectional schematic of a meat-containing tray.

This disclosure relates to various embodiments of a method for distributing or commercializing a myoglobin-containing food product having a water content of at least 5 percent by weight and a sodium chloride content of less than 1 percent by weight. The various embodiments may include various steps, such as (a) dividing the food product into retail-sized portions; (b) packaging a retail-sized portion in a food packaging article comprising a transparent portion with an interior surface such that at least a portion of the transparent portion of the interior surface is in contact with at least a portion of a surface of the food product; (c) shipping the packaged retail-sized portion to a retail outlet; and (d) displaying the packaged retail-sized portion on a shelf at the retail outlet. With this method, a desirable appearance of the surface of the food product is visible through the transparent portion of the food packaging article and is maintained for at least a 5-day display life in the absence of a gas added to the packaged retail-sized portion. To further disclose the invention, elements of the various embodiments are discussed below.

Myoglobin-Containing Food Product

Myoglobin includes a non-protein portion called heme and a protein portion called globin. The heme portion includes an iron atom in a planar ring. The globin portion can provide a three-dimensional structure that surrounds the heme group and stabilizes the molecule. The heme group provides an open binding site that can bind certain ligands having the proper shape and electron configuration to the iron atom. When a ligand enters and binds to the heme pocket, the electron configuration of the ligand affects light absorption characteristics of the heme group. Therefore, the presence or absence of a ligand such as oxygen in the heme pocket and the ligand itself can result in visible color changes of myoglobin.

When there is no ligand in the heme pocket, myoglobin is called deoxymyoglobin, which has a purple color (which is sometimes characterized as purple, deep red, dark red, reddish blue or bluish red). Molecular oxygen, $O_2$ ("oxygen"), readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. Upon dissociation of the oxygen ligand from oxymyoglobin, the iron atom is oxidized leaving the iron in the ferric state. The oxidation of the iron atom renders the molecule incapable of normal oxygen binding. As the chemical state of iron can change from ferrous ($Fe^{2+}$) to ferric ($Fe^{3+}$), the three-dimensional structure of the globin part can change in a manner that allows water molecules to bind to the heme pocket. Binding of a water molecule in the ferric iron containing heme pocket affects light absorption of the heme pocket. The oxidized form of myoglobin with a water molecule in the heme group is referred to as metmyoglobin and its color is brown. The oxidation of the iron atom is believed to result in a brown color. Heme ligands other than oxygen or water may also affect meat color. For example, the presence of carbon monoxide (CO) may cause fresh meat to have a desirable bright red color similar to oxygen. Although it has been suggested that nitric oxide (NO) can cause a dull red color (or stable pink color in the case of cured meat which also contains sodium chloride), it has been discovered that in the absence of oxygen, NO may produce a desired bright red color similar to that caused by oxygen in uncooked meat, especially in fresh, raw, unprocessed or uncured meat. It has been discovered that the development of this desired bright red color may take many hours and typically may take from 1 to 5 days and that, initially, the meat color in a vacuum package having an oxygen barrier may turn to an undesirable brown until the unexpected transformation to the desired red takes place.

Other variables that affect the stability of the globin portion also affect the affinity of the heme group for oxygen and the tendency of the chemical state of the iron atom to become oxidized. Acidity and high temperature, such as that associated with cooking, can denature the globin part thus leading to instability of the heme group. In the absence of stabilizing ligands, the oxidation of the heme iron is automatic when the globin is denatured.

"Deoxymyoglobin" refers to myoglobin in which no oxygen is present in the heme pocket. The heme iron atom is in the reduced ferrous state. It is theorized that a liquid water molecule is the ligand in the heme pocket. Deoxymyoglobin is associated with the unbloomed purple pigment of fresh meat.

"Oxymyoglobin" refers to the oxygenated form of deoxymyoglobin where the heme ligand is an oxygen gas molecule. Oxymyoglobin is associated with the bloomed red pigment of fresh meat "Metmyoglobin" refers to an oxidized form of myoglobin in which the heme iron is in the oxidized ferric state. Metmyoglobin can be formed when oxygen leaves the heme pocket of oxymyoglobin and takes an electron with it leaving the heme iron atom in the oxidized ferric state. Metmyoglobin causes the characteristic oxidized brown pigment of fresh meat.

"Carboxymyoglobin" refers to the undenatured reduced form of the carboxylated deoxymyoglobin pigment where the heme ligand is carbon monoxide. The color of carboxymyoglin is red.

"Nitroxymyoglobin" is the undenatured reduced form of the nitrosylated deoxymyoglobin pigment. The heme ligand is a nitrogen monoxide (NO) molecule. Nitrogen monoxide is also referred to as nitric oxide. Nitroxymyoglobin is also referred to as nitric oxide myoglobin, nitrosohaemachromagen or nitrosomyoglobin, among others. Nitroxymyoglobin has the same red color as oxymyoglobin and carboxymyoglobin.

"Nitric oxide metmyoglobin" is the undenatured oxidized form of deoxymyoglobin when nitrite is present. It is used to describe the brown color of meat that typically occurs after nitrite is added during the curing process.

"Nitrosohemochrome" refers to the nitrosylated protoporphyrin (heme complex) that is detached from the globin protein moiety of the myoglobin molecule. Nitrosohemochrome affords the stable pink to maroon color of cooked cured processed meat, wherein the heme iron is in the reduced state.

"Meat" or "meat product" refers to any myoglobin or hemoglobin containing tissue from livestock such as beef, pork, veal, lamb, mutton, poultry, chicken or turkey; from game such as venison, quail, goose and duck; and from fish, fishery or seafood products. The meat can be in a variety of forms including primal cuts, subprimal cuts and retail cuts as well as ground, comminuted or mixed. The meat or meat product is preferably fresh, raw, uncooked meat but may also be frozen, hard chilled or thawed. It is further believed that meat may be subjected to other irradiative, biological, chemical or physical treatments. The suitability of any particular such treatment may be determined without undue experimentation in view of the present disclosure.

A "myoglobin-containing food product" is generally a "meat" or "meat product."

The meat product can be any meat suitable for human consumption that contains a myoglobin like molecule. References to total myoglobin in a meat product refer to the amount of the myoglobin like molecules that are physiologically present in the meat tissue prior to harvesting for human consumption. Specific meat products contain a level of myoglobin sufficient to provide its characteristic color. Examples of suitable fresh meat cuts include beef, veal, pork, poultry, mutton, and lamb. The concentration of myoglobin varies in these different types of meat products. For example, beef typically contains about 3 to 20 mg of myoglobin per gram of meat, pork contains about 1 to 5 mg myoglobin per gram of meat, and chicken contains less than about 1 mg myoglobin per gram of meat. Thus, the concentration of total myoglobin compounds in the above described meat products is typically between about 0.5 mg and 25 mg of myoglobin per gram of the meat product.

"Fresh meat" means meat that is uncooked, uncured, unsmoked and unmarinated. "Fresh meat" includes post mortem meat that has been physically divided, for example, by cutting, grinding or mixing. There is no added salt (i.e., no sodium or potassium chloride) in fresh meat that has not been enhanced. Naturally occurring sodium typically is less than 50 mg/100 g of meat and accounts for a salt content of less than about 0.15 percent by weight, preferably less than 0.128 percent by weight. Values of sodium are in a database for nutritional composition of meat called the "National Nutrient Data Bank", and the data are published in Agriculture Handbook No. 8, "Composition of Foods—Raw, Processed, Prepared" referred to in the industry as "Handbook 8," both of which are hereby incorporated by reference.

Fresh meat is typically packaged in a moist unfrozen state. Typically, meat comprises moisture (water), protein and fat. Fresh meat can include about 60 percent to about 80 percent by weight moisture content, with lean meats typically having higher moisture content. Fresh meat products such as ground beef, chicken and pork often have a moisture content of about 68 percent to about 75 percent by weight depending on the fat content of the meat. (Meats with higher fat contents tend to have lower moisture content and vice versa.) Cured meats, discussed below, often have higher moisture content than fresh meats due to injection with water-based preserving compounds. Sausage products may have lower moisture content. For example, pork sausage may have a moisture content of about 40 percent by weight or higher. Preferably, the meat product can have a moisture content of at least about 5%, 10%, 15%, 20%, 30%, 40%, 50%, 60%, 70%, 80% or more.

"Enhanced meat" means meat that has added water mixed with other ingredients such as sodium chloride, phosphates, antioxidants, and flavoring, to enhance the meat, such as to make meat moist or more tender and to help enhance shelf-life. Fresh beef, pork or poultry after being "enhanced" would typically contain 0.3 to 0.6 percent by weight salt (sodium chloride).

"Processed meat" means meat that has been changed by heat and chemical processes, such as by cooking or curing. Cooked ham, hot dogs and lunch meat are examples of cured processed meat.

"Uncured processed meats" are processed meats that do not contain nitrites or nitrates. Uncured processed meats would typically contain greater than 1.0 percent by weight, typically 1.2 to 2.0 percent by weight, sodium chloride (salt). Cooked roast beef and bratwurst are examples of uncured processed meat.

"Cured meat" means meat that is preserved through direct addition of nitrite (or nitrate which is converted to nitrite), such as at least 0.005 percent by weight sodium nitrite and at least one percent by weight added salt (such as sodium chloride), for the purpose of preservation by retarding bacterial growth. Nitrites, nitrates or blends thereof are commonly present with sodium chloride in curing compositions. "Uncured meat" does not contain added nitrite or nitrate. Wet cured meats are soaked in salt brine. Dry cured meats have salt applied to the surface. Injection cured meats have the curing salts (the cure) applied by needle injection into the meat.

Cured processed meats often have 2 to 3.5 percent by weight salt. A brine content of 3.5 to 4.0 percent by weight (2.6 to 3.0 percent by weight in treated meat) as the level of sodium chloride salt (or a potassium chloride substitute for some or all of the sodium chloride) is needed in processed meat to adequately slow down bacterial growth to permit 60 to 90 day shelf life, although other means of preservation may also be employed to maintain shelf life at reduced salt levels. According to Pegg, R. B. and F. Shahidi, 2000, *Nitrite Curing of Meat*, Food & Nutrition Press, Inc., Trumbull, Conn., cured meats may have typical salt levels of 1.2 to 1.8 percent by weight in bacon, 2 to 3 percent by weight in hams, 1 to 2 percent by weight in sausages and 2 to 4 percent by weight in jerkies. It is believed that fresh meat, such as beef, pork and poultry, has substantially no nitrite (i.e., less than 0.0001 percent by weight $NO_2$) or nitrate (i.e., less then 0.0004 percent by weight $NO_3$) naturally occurring or added. The United States Department of Agriculture (USDA) permits ingoing nitrite and nitrate for cured and processed meat at a level up to a maximum of 0.0625 percent by weight sodium nitrite or 0.2187 percent by weight sodium nitrate in dry cured products. Other applications levels have different limits. For example, in typical cooked whole muscle meat products, the limit is 0.0156 percent by weight sodium nitrite and in comminuted meats, 0.0200 percent by weight sodium nitrite. The maximum nitrite usage level in hot dogs or bologna is typically 0.0156 percent by weight, while that for bacon is 0.0120 percent by weight. Sodium ascorbate (or similar compounds) may be present in these cures.

In Europe, it is believed that the minimum level of salt and nitrite required by law for curing is 1.0 percent by weight and 0.005 percent (as sodium nitrite) by weight respectively. This equates to about 0.0033 percent nitrite. The USDA has stated, "As a matter of policy, the Agency requires a minimum of 120 ppm of ingoing nitrite in all cured 'Keep Refrigerated' products, unless the establishment can demonstrate that safety is assured by some other preservation process such as thermal processing, pH or moisture control. This 120 ppm policy for ingoing nitrite is based on safety data reviewed when the bacon standard was developed." (See, "Processing Inspectors' Calculations Handbook", Chapter 3, p. 12, revised 1995). The Handbook also states, "There is no regulatory minimum ingoing nitrite level however 40 ppm nitrite is useful in that it has some preservative effect. This amount has also been shown to be sufficient for color-fixing purposes and to achieve the expected cured meat or poultry appearance." This 40 ppm is believed to be based upon sodium nitrite and would equate to about 0.0026 nitrite alone. Thus, in fresh meat (categorized as postmortem muscle tissue), oxygen can continually associate and disassociate from the heme complex of the undenatured myoglobin molecule. It is the relative abundance of three forms of the undenatured muscle pigment that determines the visual color of fresh meat. They include the purple deoxymyoglobin (reduced myoglobin), the red oxymyoglobin (oxygenated myoglobin) and the brown metmyoglobin (oxidized myoglobin). The deoxymyoglobin form typically predominates immediately after the animal is slaughtered. Thus, freshly cut meat can have a purple color. This purple color can persist for a long time if the pigment is not exposed to oxygen. Cutting or grinding exposes the pigment to oxygen in the atmosphere, and the purple color can quickly convert to either bright red (oxymyoglobin) or brown (metmyoglobin). Thus, although deoxymyoglobin is technically indicative of fresher meat, it is the red or "bloomed" meat color that consumers use as their primary criterion for perceiving freshness. It is believed without wishing to be bound by the belief, that the preferred red color of fresh meat occurs when at least 50 percent of the deoxymyoglobin molecules are oxygenated to the oxymyoglobin state. Changes in the relative percentage of each of these forms can continue to occur as fresh meat is exposed to oxygen for longer periods of time. The immediate conversion of the purple color to the desirable bright red or undesirable brown can depend on the partial pressure of oxygen at the surface. The purple color is favored at the very low oxygen level and can dominate at oxygen levels of 0 to 0.2 percent by volume. The brown color is favored when the oxygen level is only slightly higher (0.2 to 5.0 percent by volume). Consumer discrimination typically begins when the relative amount of metmyoglobin is 20 percent. A distinctly brown color is evident at 40 percent metmyoglobin which typically renders the meat unsaleable even though it remains nutritious and healthy for consumption. The perceived color of fresh meat is not static. It constantly changes because the oxidation state of the myoglobin pigment constantly changes. Further the ligands that are known to affect light absorbance patterns by myoglobin are constantly being exchanged between individual myoglobin pigments and the concentration of these ligands change as they reach equilibrium during their diffusion into the meat surface. The three known colors exhibited by the different states of myoglobin are purple, red and brown. At any one time all three of these colors coexist. The perceived color results from the color that dominates the relative percentage of these colors on the surface and subsurface areas. Consumers prefer the appearance of fresh meat when more than 50% of the myoglobin pigments at the viewing surface are in the red state. Similarly, they discriminate against fresh meat when less than 50% of the myoglobin pigments are in the red state or when more than 40% of the myoglobin pigments are in the brown state.

Certain biochemical reactions that occur in muscle tissue after death can also affect fresh meat color, such as the presence of active glycolytic enzymes that convert oxygen to carbon dioxide. Reducing coenzymes called metmyoglobin reductases present in meat convert metmyoglobin back to deoxymyoglobin, and their activity is called "MRA" (metmyoglobin reducing activity). MRA can be described as the ability of muscle to reduce metmyoglobin back to its natural deoxymyoglobin state. MRA is lost when the oxidizable substrates are depleted or when heat or acid denatures the enzymes. When the enzymes lose their activity or are denatured, the iron of the heme pigment automatically oxidizes to the metmyoglobin form, and the brown color stabilizes and dominates. MRA persists for a period of time after death of the animal depending on the amount of exposure of the meat tissue to oxygen. During this time, oxygen is continually consumed by the meat tissue. The oxygen consumption rate is referred to as "OCR". When meat that has a high OCR is exposed to oxygen, the oxygen tension is reduced so rapidly that the metmyoglobin is favored below the viewing surface. If it is close to the viewing surface, the perceived color of the meat is affected. The MRA is important to minimize this layer of metmyoglobin that forms between the bloomed surface and purple interior. As the MRA wears out, the brown metmyoglobin layer thickens and migrates toward the surface, thus terminating display life. When the MRA is high, the metmyoglobin layer is thin and sometimes not visible to the naked eye.

MRA and OCR relate to determining the types of packaging best suited for retail sale in order to prolong the desirable appearance of meat as long as possible. Hermetically sealed packages with films that are a barrier to oxygen will cause a low oxygen tension on the meat surface. Thus, metmyoglobin formation occurs and the viewing surface changes to an undesirable brown color. However, if the OCR is high enough to keep ahead of the oxygen that migrates across the packaging film and the MRA is good enough to reduce metmyoglobin that forms on the surface, then native deoxymyoglobin replaces metmyoglobin. After a period of time, the perceived color changes from brown to purple. Both of these colors are unacceptable to the consumer. For this reason, vacuum packaging by itself has historically been an unacceptable format for case ready fresh meat although it may be used to ship subprimal and other large cuts of meat from the slaughterhouse to retail butchers for further processing and repackaging. On the other hand, vacuum packaging is the format of choice for cooked and cured processed meats where the myoglobin pigment is denatured by heat. Heat from cooking causes the globin portion of the nitrosylated myoglobin molecule to denature and separate from the heme portion. It is the dissociated nitrosylated heme complex that gives cured and processed meats their characteristic color. When oxygen is eliminated from a cured processed meat package, the product's color and flavor can deteriorate slower than when oxygen is present. In some embodiments of the present disclosure, it may be advantageous to reduce or eliminate oxygen from the environment of the myoglobin containing food product in order to maximize the development of the preferred red color. A certain amount of oxygen may penetrate the meat after slaughter and fabrication. This oxygen is eliminated by the OCR/MRA activities. Similarly, those activities facilitate the dominance of the deoxymyoglobin form of the myoglobin molecule. It is believed, but not wishing to be bound by the belief, that the OCR/MRA activities also facilitate the reduction of nitrite to nitric oxide when sodium nitrite is used as a myoglobin blooming agent. In this case, the formation of deoxymyoglobin and nitric oxide allows for development of nitroxymyoglobin. Oxygen itself is a myoglobin blooming agent because it causes the formation of oxymyoglobin as described earlier herein. However, oxygen interferes with the reactions that form deoxymyoglobin and nitric oxide. Therefore, it may interfere with the bloomed color development in the presence of nitrite. Thus, it is an aspect of the present disclosure that an oxygen barrier layer be included in the food packaging article and configured to protect the meat surface from the ingress of atmospheric oxygen during the formation of the desired bloomed meat color.

Dividing the Food Product

In practice, the dividing (or butchering) of the food product is preceded by the slaughtering of an animal as the source of that food product. Meat animals are generally slaughtered as untraumatically as possible. Each animal may be stunned, usually with a blow to the head or electrical stimulation, and then is hung up by the legs. One or two of the major blood vessels in the neck are cut, and the animal bleeds to death while unconscious. It is known that stress just before an animal's death—whether physical work, hunger, duress in transport, fighting or simple fear—has an adverse effect on meat quality. Therefore, slaughtering an animal to obtain the food product may be accomplished without electrical stimulation.

In the method of distributing a food product disclosed herein, a slaughterhouse or other centralized-processing facility, divides a meat product into retail-sized portions. These retail-sized portions may include primal, subprimal and/or retail cuts.

Primal cuts of meat (also referred to as wholesale cuts) refers to large sections of a carcass that are usually sold and/or shipped to butchers who further subdivide the primal into subprimals and individual retail cuts for sale to consumers. Examples of primal cuts of beef are round, rump, loin end, flank, short loin, plate, rib, brisket, shank and chuck. Examples of pork primals include loin, leg, shoulder and belly.

Subprimal cuts are intermediate in size and may be divided further into retail cuts or are sometimes sold as retail cuts. Beef subprimals include arm, blade, ribs, beef plate, top round, bottom round, ribs, top butt, bottom butt, tenderloin and top loin. Pork subprimals include butt shoulder, picnic shoulder, center cut, sirloin, butt end, shank end, side pork and side rib.

Retail cuts of meat are consumer cuts made by dividing wholesale cuts into smaller pieces. Examples of retail cuts of beef include steaks (such as round, top round, cubed, sirloin, t-bone, porterhouse, filet mignon, rib eye, rib, skirt, flank and tip), roasts (such as blade, pot and chuck), corned brisket, fresh brisket, stew beef, short ribs, kabobs, eye of round, rolled rump, shank cross cuts, steak rolls, ground beef and beef patties. Examples of retail cuts of pork include arm roasts, arm steaks, spareribs, bacon, salt pork, ham, ham steaks, ham slices, pork tenderloin, chops, cutlets, fat back, sausage, links and ground pork.

Packaging a Retail-Sized Portion

The retail-sized portions of the myoglobin-containing food product are packaged in a food packaging article. The food product is provided within a period of time postmortem to provide a desired level of freshness and safety. Preferably, a food product comprising myoglobin is packaged less than 20 days post-mortem, more preferably less than 14, 12, 10, 6, 5, 4, 3, 2 or 1 day. Typically, the food product is a fresh meat packaged between about 2 days and 14 days post-mortem, and more preferably between about 2 days and about 12 days.

Packaging Methods

"Reduced oxygen atmosphere" or "reduced oxygen environment" when referring to a packaged meat product refers to a reduction in the partial pressure of oxygen in contact with the packaged product in comparison with the partial pressure of oxygen in the Earth's atmosphere at standard temperature and pressure at sea level. Reduced oxygen atmosphere packages may include modified atmosphere packages with the oxygen partial pressure less than that of the Earth's atmosphere at standard temperature and pressure at sea level or vacuum packages with minimal gas pressure in contact with the packaged product.

"Vacuum packaging" refers to actively eliminating atmospheric gases, most specifically oxygen, from inside the package and sealing the package so that virtually no gas is able to permeate into the package from outside the package. The result is a package with a minimum amount of oxygen gas remaining in contact with the product inside the package. The removal of oxygen from the immediate environment of the product slows down bacterial and oxidative deterioration processes thereby keeping the quality of the meat fresher for a longer period of time.

"MAP" is an abbreviation for a "modified atmosphere package." This is a packaging format where a gas is actively flushed into the headspace of a package prior to sealing. In general, the gas is modified to be different from that normally found in the atmosphere outside the MAP. The result is a package with a considerable volume of gas surrounding the viewing surface of the product within the package. A fresh meat MAP can use either an enriched-oxygen or an oxygen-free atmosphere to effectively extend shelf life.

"RAP" is an abbreviation for a "reduced atmosphere package." It can be a form of MAP wherein the atmospheric gases are minimal so that the packaging material makes physical contact with the internal contents. RAP can also be a form of vacuum packaging where the atmosphere is not completely evacuated from inside the package. Examples include the conventional fresh meat package such as a "PVC stretch wrapped tray" and the conventional case ready poultry package where a shrink film or bag is hermetically sealed around a tray of meat. In general, the fresh meat in a RAP has a higher profile than the tray used to hold the meat so that the packaging film surrounding the product makes considerable physical contact with the meat surface.

"Case ready" refers to a consumer package, particularly of fresh meat, that is prepackaged and/or labeled at a centralized location and delivered to the retail market in a format whereby it is ready for immediate display and sale. The case ready package actively extends the quality life of a fresh meat product so as to allow for the extra time that it takes to be packaged at a centrally located facility, distributed to the retail grocer and then displayed under lights for consumer selection and purchase.

In many packaging applications, heat sealable food packaging webs are desirable. Food packaging pouches with heat sealable layers can include three sides heat sealed by the pouch manufacturer leaving one open side to allow product insertion. A processor may then insert a retail-sized portion of a myoglobin-containing food product, making a final seal to hermetically enclose the product in the bag. This final seal preferably follows gas evacuation (such as by vacuum removal). The final seal after insertion of a food product may be a clip, but is usually a heat seal similar to the initial seals produced by the bag manufacturer although the actual heat sealing equipment may vary. Hot bar and impulse sealers are commonly used to make heat seals.

Tray packaging employing trays and lidding sheet or tray overwrap may also be used. Equipment such as tray sealers that are made by Ossid Corporation of Rocky Mount, N.C., U.S.A. or ULMA Packaging, Inc. of Woodstock, Ga., U.S.A., may be used to package meat, such as beef, poultry or other meats. Tray packaging may optionally involve replacement of the gaseous environment within the package by one or more gases to provide some advantage such as to assist product preservation.

For the present disclosure, two additional examples of types of packaging methods include, but are not limited to, thermoforming and vacuum skin packaging.

Thermoforming and other similar techniques are well known in the art for packaging food products. A description of typical thermoforming techniques appears in *Modern Plastics Encyclopedia,* 1984-1985, at pages 329-336, Brody, Aaron L. et al., *The Wiley Encyclopedia of Packaging Technology,* 2nd Edition, 1997, at pages 910-921; and Mark, Herman F., *Encyclopedia of Polymer Science and Technology,* 3rd edition, 2003 at pages 222-251. Suitable thermoforming methods include standard, deep-draw or plug-assist vacuum forming. During standard vacuum forming, a thermoplastic web, such as a film or sheet, is heated and a vacuum is applied beneath the web allowing atmospheric pressure to force it into a preformed mold. When relatively deep molds are employed, the process is referred to as a "deep-draw" application. In a plug-assist vacuum forming method, after the thermoplastic film or sheet has been heated and sealed across a mold cavity, a plug shape similar to the mold shape impinges on the plastic substrate and, upon the application of vacuum, the film conforms to the mold surface.

After the thermoformed article, or thermoform, is in place, a product is placed on the thermoform and a second closing film or sheet is draped over the product. The package is evacuated and sealed with a device such as a heated jaw. The thermoform encloses a substantial portion, generally more than half, of the product to be packaged. The closing film or sheet remains mostly flat atop the product and may display product labeling consisting of colored type, pictures, etc.

Embodiments of the thermoformed films that exhibit measurable shrink rates up to 10 percent in both the machine direction and the transverse direction at 90° C. may also be used in form shrink applications such as those made using Multivac R550, R250 and R150 thermoforming machine, for example, in combination with a heat shrinkable lidding web.

The forming processes using forming films are commonly performed by the food packager, such as a centralized processing facility, using a horizontal thermoform fill seal machine. The machines usually use two continuous webs or rolls of film, though cut sheets may be used, especially for rigid or semi-rigid films. Typically, the lower web is heated and then formed into a cup shape. Frequently, a mold and/or cavity is used which has the desired shape, and a vacuum assist may be used. The shape of the formed film is set by cooling, which is then filled with food. The upper web becomes the lid and is sealed to the lower web under vacuum packaging conditions. Although the literature reports that 90 percent of machines are run in this manner, sometimes the upper web is also formed, and sometimes the upper web is formed while the bottom web is not. The draw depth of thermoformed packages typically ranges from 0.25 inch up to 8 inch. Many products have a draw depth of at least 0.50 inch and most between 0.50 inch to 2.5 inch. The draw depth may be set at any dimension depending on the product and amount of product to be packaged. The geometry may be circular (e.g., for bologna), rectangular, square, triangular (e.g., for cheese), ovals (e.g., for loop sausage) or irregular shapes such as for shingle packs. Vacuum skin packaging is preferable for irregular shaped foods, such as lobsters and steak cuts, where the food itself acts as the mold for the forming web.

Vacuum skin packaging (VSP) is another process well known in the art that uses a thermoplastic packaging material to enclose a product. Various apparatus and processes are described in U.S. Pat. Nos. 3,835,618; 3,950,919 and Re 30,009, all issued to Perdue. The vacuum skin packaging process is in one sense a type of thermoforming process in which an article to be packaged serves as the mold for the thermoform. An article may be placed on a support member, such as a rigid or semi-rigid card, tray or other bottom; the supported article is then passed to a chamber where a top web is drawn upward against a heated dome and then draped over the article. The movement of the plastic top web is controlled by vacuum and/or air pressure; and in a vacuum skin packaging arrangement, the interior of the container is evacuated before final sealing of the top web to the support. Thermoformable material may be used as both the top web and bottom support in conjunction with an intermediate support for products held on either side of the support as shown, for example, in U.S. Pat. No. 3,966,045. Examples of vacuum skin packaging trays, webs and processes are disclosed in U.S. Pat. No. 4,611,456 to Gillio-tos et al.; U.S. Pat. No. 5,846,582 to Mayfield et al.; and in U.S. Pat. No. 5,916,613 to Stockley Ill., which are hereby incorporated by reference herein.

In vacuum skin packaging, a product to be packaged is placed on a product supporting member. The product serves as the mold for a thermoformable polymeric web. The thermoformable web is formed about the product by means of differential air pressure. However, the term "vacuum skin packaging" refers to not only the fact that the thermoformable web is formed around the product by vacuum or differential air pressure, but also to the fact that the product is packaged under vacuum, with the volume containing the product being evacuated during the packaging.

Vacuum skin packaging processes generally use a vacuum chamber with an open top. The product (on an impermeable backing board through which vacuum is not drawn), is placed on a platform within the vacuum chamber. The top of the chamber is covered by a sheet which is clamped tightly against the chamber to form an air-tight closure. The chamber is evacuated while the web is heated to its forming and softening temperature. The platform is then raised to drive the product into the softened sheet, and air reintroduced into the chamber can be used about the film to force it tightly around the product.

In vacuum skin packaging, it is also known to release the vacuum and allow ambient air into the chamber, after the chamber has been evacuated and the product driven into the heat-softened sheet, or vice versa. In this manner, the thermoplastic sheet molds more or less over and against the product, since there is a vacuum inside the package and ambient air pressure, or more than ambient air pressure, immediately outside of the package.

In prior art case ready applications, the meat product is sometimes packaged in a modified atmosphere package ("MAP"), wherein the meat is maintained in a sealed pocket containing a headspace with an atmosphere that is different than ambient air. For example, a MAP can maintain red meat in carbon dioxide, with very low oxygen content, such as in a multipack where the master package is subsequently opened and the contained individual packages in oxygen permeable films are exposed to the atmosphere thereby causing the meat to bloom red. Also, the preferred color of fresh meat can be promoted and maintained using a MAP with enriched oxygen content. Similarly, a MAP with small concentrations of carbon monoxide (CO) can be used to cause and maintain a preferred red color of fresh meat. It is contemplated that the present disclosure provides a replacement for case-ready MAP. With the present disclosure, no gases, such as oxygen, carbon dioxide or carbon monoxide, are added during the packaging of the myoglobin-containing food product in a food packaging article.

Referring now to the drawings, FIG. 1 depicts a cross sectional schematic of a meat containing tray 50. Tray 51 has a bottom 52 with integral side walls 52a and 52b supporting a retail cut of meat 53 such as pork. Web 54 seals the top of the tray 51 and provides a hermetic seal 55a and 55b all along the continuous flanges of the sidewall 52a, 52b. The web 54 is vacuum sealed with the food contact surface 57 in intimate contact with meat surface 58. Meat side surfaces 59a, 59b are not in contact with the food contact layer 57 but instead are exposed to an atmosphere 56. The tray also has an inside surface 60, and the meat also has a meat bottom surface 61.

Figure 2:
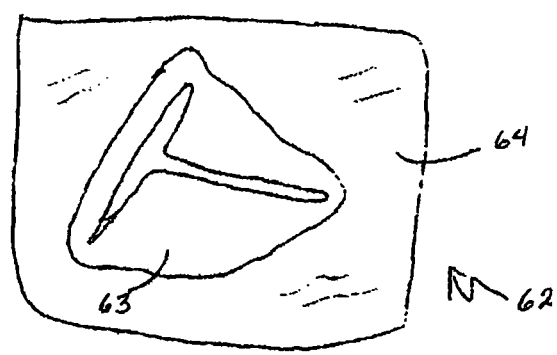
FIG. 2 shows a top view of a vacuum skin packaging film enclosed meat cut.

Referring now to FIG. 2, a top view of a package 62 depicts a myoglobin-containing food product 63 such as a bone-in cut of meat on a substrate and covered under a vacuum skin packaging web 64 with a food contact surface in contact with the meat. The web is transparent to allow perception of the color and meat surface characteristics.

Figure 3:
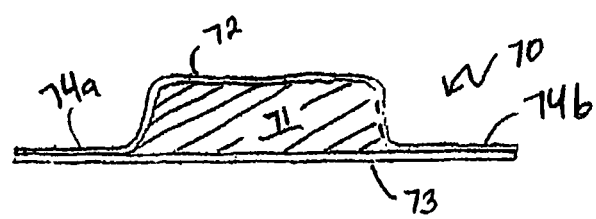
FIG. 3 shows a cross-sectional schematic of a meat in a pre-formed container.

Referring now to FIG. 3, a cross sectional schematic of a meat containing formed container 70 is depicted having a myoglobin-containing food product 71 disposed in a thermoformed pocket 72 which is heat sealed to a non-oriented web 73 around the meat cut at heat seal 74a which is continuous and joins heat seal 74b to form a hermetic vacuum package having a reduced oxygen atmosphere with intimate contact between the food product and the interior surfaces of web 72 and 73.

In another embodiment, the packaging step may further include the insertion of a packaging insert. A packaging insert is an article that is incorporated in a packaged food product which is not an integral part of the packaging film or the food packaging article that forms the outer wrapper. A packaging insert, when incorporated in a packaged food, is in contact with the food product. Packaging inserts can serve any of a variety of purposes including absorbing liquids, cushioning sharp or rough surfaces such as bones, protecting a surface on the food product, modifying the atmosphere within the package, or containing all or a portion of the food product such as the giblets inside of poultry. Examples of packaging inserts include absorbent and non-absorbent pads, soaker pads, purge control pads, puncture resistant inserts, packets, pouches, sachets and trays.

Food Packaging Article

In accordance with the present disclosure, a "food packaging article" refers to an object of manufacture which can be in the form of webs (such as monolayer or multilayer films or monolayer or multilayer sheets), containers (such as bags, shrink bags, pouches, casings, trays, lidded trays, overwrapped trays, form shrink packages, vacuum skin packages, flow wrap packages or thermoformed packages) or combinations thereof. It will be appreciated by those skilled in the art that, in accordance with the present disclosure, packaging articles may include flexible, rigid or semirigid materials and may be heat shrinkable or non-heat-shrinkable or oriented or non-oriented.

"Consumer package" refers to any container in which a product is enclosed for the purpose of display and sale to household consumers.

In discussing plastic web packaging, various polymer acronyms are used herein and they are listed below:

EAA—Copolymer of ethylene with acrylic acid
EAO—Copolymer of ethylene with at least one α-olefin
EBA—Copolymer of ethylene with butyl acrylate
EEA—Copolymer of ethylene with ethyl acrylate
EMA—Copolymer of ethylene with methyl acrylate
EMM—Copolymer of ethylene with methacrylic acid
EVA—Copolymer of ethylene with vinyl acetate
EVOH—A saponified or hydrolyzed copolymer of ethylene and vinyl acetate
PB—Polybutylene-1, a butylene homopolymer and/or copolymer of a major portion of butylene-1 with one or more α-olefins; also known as butene-1
PE—Polyethylene, an ethylene homopolymer and/or copolymer of a major portion of ethylene with one or more α-olefins
PP—Polypropylene homopolymer or copolymer
PET—Polyethylene terephthalate
PETG—Glycol-modified polyethylene terephthalate
PLA—Polylactic acid; also known as polylactide
PVDC—Polyvinylidene chloride; this also includes copolymers of vinylidene chloride, especially with vinyl chloride and/or methyl acrylate (MA) and is also referred to as saran.
PVC—Polyvinyl chloride In referring to blends of polymers, a colon (:) will be used to indicate that the components to the left and right of the colon are blended. In referring to film structure, a slash "/" will be used to indicate that components to the left and right of the slash are in different layers; the relative position of components in layers may also be indicated by use of the slash to indicate film layer boundaries.

A "core layer," as used herein, refers to a layer positioned between and in contact with at least two other layers.

An "outer layer," as used herein is a relative term and needs not be a surface layer.

The term "exterior layer" refers to a layer comprising the outermost surface of a film or product. For example, an exterior layer can form the exterior surface of a package that contacts the exterior layer of another package during overlapping heat sealing of two packages.

The term "interior layer" refers to a layer comprising the innermost or interior surface of a film or product. For example, an interior layer forms the interior surface of an enclosed package. The interior layer can be the food-contact layer and/or the sealant layer.

As used herein, the term "barrier" and the phrase "barrier layer," as applied to films and/or film layers, are used with reference to the ability of a film or film layer to serve as a barrier to one or more gases or moisture.

The term "nanocomposite" refers to a mixture that includes a polymer or copolymer having dispersed therein a plurality of individual platelets which may be obtained from exfoliated modified clay and having oxygen barrier properties.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may comprise components of both the first layer and the second layer to promote simultaneous adhesion of the adhesive layer to both the first layer and the second layer to opposite sides of the adhesive layer. Tie or adhesive layers may be incorporated into the article by any of the well known processes for making multilayer structures such as coextrusion, adhesive lamination and the like.

As used herein, the phrases "seal layer," "sealing layer," "heat seal layer," and "sealant layer," refer to an outer film layer, or layers, involved in the sealing of the film to itself; to another film layer of the same film or another film; and/or to another article which is not a film, (such as a tray). In general, the sealant layer is an interior layer of any suitable thickness, that provides for the sealing of the film to itself or another layer. With respect to packages having only fin-type seals, as opposed to lap-type seals, the phrase "sealant layer" generally refers to the interior surface film layer of a package. The inside layer frequently can also serve as a food contact layer in the packaging of foods.

"Food contact layer," "food contact portion" or "food contact surface" refers to the portion of a packaging material that contacts a packaged myoglobin-containing food product.

As used herein, the term "lamination" and the phrase "laminated film" refer to the process and resulting product made by bonding together two or more films or other materials. Lamination can be accomplished by joining films together with adhesives, with heat and pressure, with spread coating and/or with extrusion coating. The term laminate is also inclusive of coextruded multilayer films comprising one or more tie layers.

"Polyolefin" is used herein broadly to include polymers such as polyethylene, ethylene-alpha olefin copolymers (EAO), polypropylene, polybutene and ethylene copolymers having a majority amount by weight of ethylene polymerized with a lesser amount of a comonomer, such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including, for example, heterogeneous and homogeneous systems and Ziegler, Phillips, metallocene, single site and constrained geometry catalysts to produce polymers having different combinations of properties. Such polymers may be highly branched or substantially linear and the branching, dispersity and average molecular weight may vary depending upon the parameters and processes chosen for their manufacture in accordance with the teachings of the polymer arts.

"Polyethylene" is the name for a polymer whose basic structure is characterized by the chain $-(CH_2-CH_2-)_n$. Polyethylene homopolymer is generally described as being a solid which has a partially amorphous phase and partially crystalline phase with a density of between 0.860 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 g/cm$^3$. Most commercially utilized polyethylenes are not unsubstituted homopolymer but instead have $C_2$-$C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

Individuals skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made, since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Another broad grouping of polyethylene is high pressure, low density polyethylene (LDPE). LDPE is used to denominate branched homopolymers having densities between 0.915 and 0.930 g/cm$^3$. LDPEs typically contain long branches off the main chain (often termed "backbone") with alkyl substituents of 2 to 8 carbon atoms or more.

Linear Low Density Polyethylenes (LLDPEs) are copolymers of ethylene with alpha-olefins having densities from 0.915 to 0.940 g/cm$^3$. The alpha-olefin utilized is usually 1-butene, 1-hexene or 1-octene. Ziegler-type catalysts are usually employed, although Phillips catalysts are also used to produce LLDPE having densities at the higher end of the range, and metallocene and other types of catalysts are also employed to produce other well known variations of LLDPEs.

Ethylene α-olefin copolymers (EAOs) are copolymers having an ethylene as a major component copolymerized with one or more alpha olefins such as octene-1, hexene-1 or butene-1 as a minor component. EAOs include polymers known as LLDPE, VLDPE, ULDPE and plastomers and may be made using a variety of processes and catalysts, including metallocene, single-site and constrained geometry catalysts as well as Ziegler-Natta and Phillips catalysts.

Very Low Density Polyethylenes (VLDPEs), which are also called "Ultra Low Density Polyethylenes" (ULDPEs), comprise copolymers of ethylene with alpha-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm$^3$. A process for making VLDPEs is described in European Patent Document publication number 120,503 whose text and drawing are hereby incorporated by reference into the present document. Sometimes VLDPEs having a density less than 0.900 g/cm$^3$ are referred to as "plastomers."

Polyethylenes may be used alone, in blends and/or with copolymers in both monolayer and multilayer films for packaging applications for such food products as poultry, fresh red meat and processed meat.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

As used herein, the term "modified" refers to a chemical derivative, e.g., one having any form of anhydride functionality, such as anhydride of maleic acid, crotonic acid, citraconic acid, itaconic acid, fumaric acid, etc., whether grafted onto a polymer, copolymerized with a polymer, or otherwise functionally associated with one or more polymers, and is also inclusive of derivatives of such functionalities, such as acids, esters, and metal salts derived therefrom. Another example of a common modification is acrylate modified polyolefin.

As used herein, terms identifying polymers, such as "polyamide" or "polypropylene," are inclusive of not only polymers comprising repeating units derived from monomers known to polymerize to form a polymer of the named type but are also inclusive of comonomers, as well as both unmodified and modified polymers made by, for example, derivitization of a polymer after its polymerization to add functional groups or moieties along the polymeric chain. Furthermore, terms identifying polymers are also inclusive of "blends" of such polymers. Thus, the terms "polyamide polymer" and "nylon polymer" may refer to a polyamide-containing homopolymer, a polyamide-containing copolymer or mixtures thereof.

The term "polyamide" means a high molecular weight polymer having amide linkages (—CONH—)$_n$ which occur along the molecular chain, and includes "nylon" resins which are well known polymers having a multitude of uses including utility as packaging films, bags, and casings. See, for example, *Modern Plastics Encyclopedia*, 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon" as used herein refers more specifically to synthetic polyamides, either aliphatic or aromatic, either in crystalline, semi-crystalline, or amorphous form characterized by the presence of the amide group —CONH. It is intended to refer to both polyamides and co-polyamides.

Thus the terms "polyamide" or "nylon" encompass both polymers comprising repeating units derived from monomers, such as caprolactam, which polymerize to form a polyamide as well as copolymers derived from the copolymerization of caprolactam with a comonomer which when polymerized alone does not result in the formation of a polyamide. Preferably, polymers are selected from compositions approved as safe for producing articles intended for use in processing, handling and packaging of food, such as nylon resins approved by the U.S. Food and Drug Administration provided at 21 CFR §177.1500 ("Nylon resins"), which is incorporated herein by reference. Examples of these nylon polymeric resins for use in food packaging and processing include nylon 6,6, nylon 6,10, nylon 6,6/6,10, nylon 6/6,6, nylon 11, nylon 6, nylon 6,6T, nylon 6,12, nylon 12, nylon 6/12, nylon 6/6,9, nylon 4,6, nylon 6-3-T, nylon MXD-6, nylon MXDI, nylon 12T and nylon 6I/6T. as disclosed at 21 CFR §177.1500. Examples of such polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 6,6/6,10 (e.g., manufactured by the condensation of mixtures of nylon 6,6 salts and nylon 6,10 salts), nylon 6/6,9 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

In the term "amorphous nylon copolymer," the term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," *Encyclopedia of Polymer Science and Engineering*, 2nd Ed., pp. 789-842 (J. Wiley & Sons, Inc. 1985). In particular, the term "amorphous nylon copolymer" refers to a material recognized by one skilled in the art of differential scanning calorimetry (DSC) as having no measurable melting point or no heat of fusion (less than 0.5 cal/g) as measured by DSC using ASTM 3417-83. The amorphous nylon copolymer may be manufactured by the condensation of hexamethylenediamine, terephthalic acid and isophthalic acid according to known processes. Amorphous nylons also include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, "EVOH" refers to ethylene vinyl alcohol copolymer. EVOH is otherwise known as saponified or hydrolyzed ethylene vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene and there is a direct relationship between ethylene content and melting point. For example, EVOH having a melting point of about 175° C. or lower is characteristic of EVOH materials having an ethylene content of about 38 mole percent or higher. EVOH having an ethylene content of 38 mole percent has a melting point of about 175° C. With increasing ethylene content, the melting point is lowered. A melting point of about 158° C. corresponds to an ethylene content of 48 mole percent. EVOH copolymers having lower or higher ethylene contents may also be employed. It is expected that processability and orientation would be facilitated at higher contents; however, gas permeabilities, particularly with respect to oxygen, may become undesirably high for certain packaging applications which are sensitive to microbial growth in the presence of oxygen. Conversely, lower contents may have lower gas permeabilities, but processability and orientation may be more difficult.

As used herein, the term "polyester" refers to synthetic homopolymers and copolymers having ester linkages between monomer units which may be formed by condensation polymerization methods. Polymers of this type are preferably aromatic polyesters and more preferably, homopolymers and copolymers of polyethylene terephthalate, polyethylene isophthalate, polybutylene terephthalate, polyethylene naphthalate and blends thereof. Suitable aromatic polyesters may have an intrinsic viscosity between 0.60 to 1.0, preferably between 0.60 to 0.80.

As used herein, the term "ionomer" refers to an ionic copolymerformed from an olefin and an ethylenically unsaturated monocarboxylic acid having the carboxylic acid moieties partially neutralized by a metal ion. Suitable metal ions may include, but are not limited to, sodium, potassium, lithium, cesium, nickel and zinc. Suitable carboxylic acid comonomers may include, but are not limited to, ethylene/methacrylic acid, succinic acid, itaconic acid, vinyl acetate/methacrylic acid, methyl/methacrylate/methacrylic acid, styrene/methacrylic acid and combinations thereof. Useful ionomer resins may include an olefinic content of at least 50 mole percent based upon the copolymer and a carboxylic acid content of between 5-25 mole percent based upon the copolymer. Useful ionomers are also described in U.S. Pat. No. 3,355,319 to Rees, which is incorporated herein by reference in its entirety.

As used herein, the phrase "easy open feature" refers to any means for accessing the contents of a container which obviates the need to cut and/or pierce the container with a knife, scissors or any other sharp implement. An easy open feature may be in at least one portion of the web used to form the container and include one or more cuts, notches, tear strips, surface-roughened areas, lines of structural weakness (such as scoring or perforations) or combinations thereof. Examples of these types of easy open features are described in co-pending U.S. Patent Application Publication Nos. 2005/0084636 to Papenfuss et al. entitled "Tear Initiation and Directional Tear Films and Packages Made Therefrom" and 2005/0254731 to Berbert et al. entitled "Easy-Open Handle Bag for Medium to Heavy Duty Applications," both of which are incorporated by reference herein. Alternatively, the easy open feature may include one or more frangible or peelable layers adapted to manually separate or delaminate at least a portion of the web used to form the container and are described in U.S. Reissued Pat. No. RE37,171 to Busche et al., which is hereby incorporated by reference. It will be appreciated that peelable webs may further comprise one or more reclosable peelable layers, examples of which are described in, but not limited to, co-pending U.S. patent application Ser. No. 11/048,425 to Haedt et al. and Ser. No. 11/247,923 to Cruz et al., which are hereby incorporated by reference herein. Examples of still other alternative easy open features include reclosable interlocking fasteners attached to at least a portion of the web used to form the container. Reclosable fasteners, including but not limited to zipper closures and sliders, are in general, known and taught, for example, in U.S. Pat. Nos. 5,063,644; 5,301,394; 5,442,837; 5,964,532; 6,409,384; 6,439,770; 6,524,002; 6,527,444; 6,609,827; 6,616,333; 6,632,021; 6,663,283; 6,666,580; 6,679,027; and U.S. Patent Application Nos. 2002/0097923; and 2002/0196987, each of which is incorporated by reference herein.

According to the disclosure, the food packaging article may be a single-layer food packaging web. In another embodiment, the food packaging web may also be a multi-layer web, including an exterior surface and an interior surface and 2, 3, 4, 5, 6, 7, 8, 9, or more polymeric web layers. The inventive food packaging webs can have any suitable composition or configuration. Preferably, the food packaging web fulfills multiple functional requirements which may be present in one or more or a combination of layers. For example, a single layer web may combine the functions of oxygen barrier and food contact with one or more additional functions such as puncture resistance, abuse resistance, printability, moisture barrier, heat sealability, transparency, high gloss, low toxicity, high temperature resistance, low temperature flexibility, etc. Alternatively, multiple layers may be employed to add functionality. Preferred webs may also provide a beneficial combination of one or more or all of the properties including low haze, high gloss, high or low shrinkage values at 90° C. or less, good machinability, good mechanical strength and good barrier properties including high barriers to oxygen and water. In one aspect, the web of the food packaging article has a gloss value of at least 70 at 45°.

A typical beneficial food packaging web according to embodiments of the present invention may have an interior surface food contact layer which also serves as a sealant layer, and a heat resistant and abuse resistant exterior surface layer with a core layer there between which comprises an oxygen barrier material. Another common suitable web has adhesive layers on either side of the core oxygen barrier layer to connect with the surface layers.

It is essential that the food packaging article of the present disclosure have a food contact layer. This food contact layer may also function as a heat sealing or heat sealable layer to facilitate formation of hermetically sealed packages, although tubular plastic casings may also be used and sealed, for example, by clips as known in the art. Preferred webs of the present invention utilize a food contact layer which has heat sealing properties.

The terms "heat sealing layer" or "sealant layer" are used interchangeably to refer to a layer which is heat sealable (i.e., capable of fusion bonding by conventional indirect heating means which generate sufficient heat on at least one film contact surface for conduction to the contiguous film contact surface and formation of a bond interface therebetween without loss of the web integrity). The bond interface between contiguous inner layers preferably has sufficient physical strength to withstand the packaging process and subsequent handling including, for example, tensions resulting from stretching or shrinking attendant with the presence of a food body sealed within a package utilizing a film having a heat sealable layer. Advantageously, the bond interface is preferably sufficiently thermally stable to prevent gas or liquid leakage therethrough when exposed to above or below ambient temperatures, such as those during one or more of the following: packaging operations, storage, handling, transport, display or processing of food. Heat seals may be designed to meet different conditions of expected use and various heat seal formulations are known in the art and may be employed with the present disclosure. In certain optional embodiments, heat seals may be subjected to pasteurization or cook-in temperatures and conditions, for example, in sealed bag, vacuum skin package (vsp) or sealed tray form. For use in cook-in applications, heat seals should withstand elevated temperatures up to about 160-180° F. (71-82° C.) or higher, for example, 212° F. (100° C.) for extended periods of time, such as up to 4 to 12 hours in environments which may range from heated humidified air or steam to submersion in heated water. Preferably, the food contact or heat seal layer is heat sealable to itself, but may be sealable to other objects, films or layers, such as to a tray when used as a lidding film or to an outer layer in a lap seal or in certain tray overwrap embodiments. Also, in certain embodiments, the food contact layer need not be heat sealable.

A sealing layer is preferably positioned at or near the interior surface of the packaging web and can be an interior surface layer which allows a monolayer or multilayer web to be formed into a resulting package, for example, when used as a clamshell container, when sealed to itself, when sealed to a tray (such as when used as a lidding film or sheet) or when sealed to a lidding film or sheet (such as when used as a tray). An exterior layer may also be a heat sealable layer and used in place of or in addition to an interior layer for this purpose.

The food contact layer may comprise a sealant layer and may comprise a heat sealable polymeric material such as a polyolefin or blend thereof, for example, polyethyelenes such as low density polyethylene (LDPE), high density polyethylene (HDPE), ethylene α-olefin copolymers (EAO) (including, for example, plastomers), very low density polyethylene (VLDPE), linear low density polyethylene (LLDPE), polypropylene homopolymers, polypropylene copolymers, polybutylene homopolymers, polybutylene copolymers or homogeneous polyolefin resins, such as those made with constrained geometry catalysts or metallocene single-site catalysts, including, for example, copolymers of ethylene or propylene with at least one $C_{4-8 \text{ or higher}}$ α-olefins (e.g., butene-1, hexene-1 or octene-1 or combinations thereof) with a majority of polymeric units derived from ethylene or propylene. Ethylene vinyl acetate (EVA) copolymers, ethylene butyl acrylate copolymers (EBA), ethylene methyl acrylate copolymers (EMA), ethylene methacrylic acid copolymers (EMAA), ethylene ethyl acrylate copolymers (EEA), ethylene acrylic acid copolymers (EM), polyesters or ionomers are also suitable materials for forming the inner surface heat sealable layer. (An ionomer is essentially a metal salt neutralized copolymer of ethylene and acrylic or methacrylic acid.) Suitable sealant/food contact layer materials often include ionomers, polyolefins or blends thereof, such as those disclosed in U.S. Pat. Nos. 6,964,816; 6,861,127; 6,815,023; 6,773,820; 6,682,825; 6,316,067; and 5,759,648; 5,663,002; and U.S. Patent Application Publication Nos.: 2005/0129969 (Schell et al.); and 2004/0166262 (Busche et al.) which are hereby incorporated by reference herein. Food contact or sealant layers may also comprise polyamides such as nylon, polyesters such as polyethylene terephthalate (PET), polystyrene, polycarbonates, cyclic olefin copolymers, polyacrylonitrile or copolymers or blends thereof. The food contact layer may be 100% of the thickness of the total structure. The food contact or sealant layers in multilayer structures may be of any thickness with thicknesses in multilayer structures of up to 1% to 5% to 15% to 50% or more of the total thickness contemplated. Preferred examples of such sealable resins comprising a food contact and/or sealant layer include ethylene α-olefin copolymers commercially available from Dow Chemical Company under trade names of "AFFINITY", "ATTANE" or "ELITE" (including octene-1 as α-olefin) and ExxonMobil Co. under a trade name of "EXACT" (including hexene-1, butene-1 and octene-1 as comonomer) and include ionomers commercially available from DuPont Company under the trade name Surlyn®).

The food packaging article of the present disclosure may also include a barrier layer. The barrier layer preferably functions as a gas barrier layer but may also function as a moisture barrier layer. The gas barrier layer is preferably an oxygen barrier layer, and is preferably a core layer positioned between the first and second layers. For example, the oxygen barrier layer can be in contact with a first surface layer and an adhesive layer or may be sandwiched between two tie layers and/or two surface layers.

The barrier layer may provide a suitable barrier to oxygen for the desired preservation of the article to be packaged under the anticipated storage conditions. In one aspect, an oxygen barrier is used in the meat package or packaging web that is maintained at a reduced oxygen atmosphere. The oxygen barrier is preferably selected to provide oxygen permeability sufficiently diminished to permit a desirable color to be induced or maintained within the packaged meat. For example, a film or sheet may comprise an oxygen barrier having an oxygen permeability that is low enough to reduce the activity of metmyoglobin reducing enzymes that reduce myoglobin in the meat, and/or maintain a reduced oxygen atmosphere in contact with the meat to reduce oxygen binding to myoglobin on the surface of the packaged fresh meat.

The oxygen barrier layer can comprise any suitable material, such as PVDC, nylon, EVOH, PVOH, polyvinylidene chloride, polyamide, polyester, polyalkylene carbonate, polyacrylonitrile, nanocomposite, a foil (such as aluminum foil), a metallized film (such as aluminum vapor deposited on a polyolefin or polyester), metal-oxide coated film, methyl acrylate copolymer or others, including blends and combinations, as known to those of skill in the art. The oxygen barrier layer of a film or sheet may preferably comprise polyvinyl alcohol copolymer or EVOH, although oxygen barrier layers comprising polyvinylidene chloride-vinyl chloride copolymer (PVDC or VDC-VC) or vinylidene chloride-methyl acrylate copolymer (VDC-MA) as well as blends thereof, may also be preferable. One preferred EVOH barrier material is a 44 mole percent ethylene EVOH resin E151B sold by Eval Company of America, under the trade name Eval® LC-E151B. Another example of an EVOH that may be acceptable can be purchased from Nippon Gohsei (or Soarus, LLC in the USA) under the trade name Soarnol® AT (44 mole percent ethylene EVOH) or Soarnol® ET (38 mole percent ethylene EVOH).

The barrier layer may also provide desirable optical properties when stretch oriented, including transparency and low haze and a stretching behavior compatible with the layers around it. It is desirable that the thickness of the barrier layer be selected to provide the desired combination of the performance properties sought, for example, with respect to oxygen permeability, shrinkage values especially at low temperatures, ease of orientation, delamination resistance and optical properties. Suitable thicknesses in multilayer films are less than 15 percent, for example, from 3 to 13% of the total film thickness and preferably less than about 10 percent of the total thickness of the multilayer film. Greater thicknesses may be employed; however, oxygen barrier polymers tend to be relatively expensive, and therefore it is expected that less costly resins will be used in other layers to impart desirable properties once a suitable thickness is used to achieve the desired gas barrier property for the film layer combination. For example, the thickness of a core oxygen barrier layer may advantageously be less than about 0.45 mil (10.16 microns) and greater than about 0.05 mil (1.27 microns), including 0.10, 0.20, 0.25, 0.30, 0.40, or 0.45 mil thick.

For perishable food packaging, the oxygen ($O_2$) permeability desirably should be minimized. The reduced oxygen package may comprise an oxygen barrier layer having an oxygen transmission rate of less than about 310, 200, 100, 75, 50, 40, 30, 20, 10, 5 or 3 $cm^3/m^2/24$ hours measured at 0% relative humidity and 23° C. Preferably, the oxygen barrier layer has an oxygen transmission rate of less than about 310 $cm^3/m^2/24$ hours measured at 0% relative humidity and 23° C., more preferably less than about 75 $cm^3/m^2/24$ hours, and most preferably less than about 20 $cm^3/m^2/24$ hours.

The food packaging article of the present disclosure may also include an exterior surface layer. Since it is seen by the user/consumer, in both the monolayer and multilayer packaging webs embodiments of the disclosure, the exterior surface of the web should enhance optical properties of the film or sheet and may preferably have high gloss. Also, it should withstand contact with sharp objects and provide abrasion resistance, and for these reasons, it is often termed the abuse-resistant layer. This exterior abuse-resistant layer may or may not also be used as a heat sealable layer. As the exterior surface layer of the web, this layer most often is also the exterior layer of any package, bag, pouch, tray or other container and is therefore subject to handling and abuse, such as from equipment during packaging and from rubbing against other packages and shipping containers and storage shelves during transport and storage. This contact causes abrasive forces, stresses and pressures which may abrade away the film causing defects to printing, diminished optical characteristics or even punctures or breaches in the integrity of the package. Therefore, the exterior surface layer is typically made from materials chosen to be resistant to abrasive and puncture forces and other stresses and abuse which the packaging may encounter during use. The exterior surface layer should be easy to machine (i.e., be easy to feed through and be manipulated by machines, for example, for conveying, packaging, printing or as part of the web or bag manufacturing process). It should also facilitate stretch orientation where a high shrinkage film is desired, particularly at low temperatures such as 90° C. and lower. Suitable stiffness, flexibility, flex crack resistance, modulus, tensile strength, coefficient of friction, printability and optical properties are also frequently designed into exterior layers by suitable choice of materials. This layer may also be chosen to have characteristics suitable for creating desired heat seals which may be resistant to burn through (such as by impulse sealers) or may be used as a heat sealing surface in certain package embodiments (such as with overlap seals).

The exterior layer may be formed of similar materials as those of the interior layer. In one embodiment, at least one and preferably both interior and exterior layers utilize polyolefin resins, preferably a blend of (i) EVA, (ii) EAO (such as VLDPE), and (iii) an ethylene-hexene-1 copolymer having a melting point of 80 to 98° C., preferably 80 to 92° C. Each of the three polymers typically comprises 20 to percent by weight of the layer. EVA, when used in the outer layer preferably has 3 percent by weight to 18 percent by weight vinyl acetate content to provide good shrinkability, if shrinkability is desired. Blends of EAOs are also usefully employed in the outer layer.

The exterior layer thickness for multilayer webs is typically 0.5 to 2.0 mil. Thinner layers may be less effective for abuse resistance; however thicker layers, though more expensive, may advantageously be used to produce webs having unique highly desirable puncture resistance and/or abuse resistance properties. Heavy gauge films, typically 5 to 7 mil or more, are needed in demanding applications, which are usually satisfied by very expensive and complex laminated film structures and/or secondary packaging materials such as bone guards, pads and overwrap.

In one food packaging article embodiment of this disclosure, an exterior thermoplastic layer of the enclosing multilayer web is on the opposite side of a core layer from the interior layer and in direct contact with the environment. In a suitable three layer embodiment, this exterior layer is directly adhered to the core layer which is preferably an oxygen barrier layer.

The food packaging article may also include intermediate layers. An intermediate layer is any layer between the exterior layer and the interior layer and may include oxygen barrier layers, tie layers or layers having functional attributes useful for the film structure or its intended uses. Intermediate layers may be used to improve, impart or otherwise modify a multitude of characteristics, such as printability for trap printed structures, shrinkability, orientability, processability, machinability, tensile properties, drape, flexibility, stiffness, modulus, designed delamination, easy opening features, tear properties, strength, elongation, optics, moisture barrier, oxygen or other gas barrier, or radiation selection or barrier (such as to ultraviolet wavelengths, etc).

One or more adhesive layers, also known in the art as "tie layers," can be selected to promote the adherence of adjacent layers to one another in a multilayer web and prevent undesirable delamination. A multifunctional layer is preferably formulated to aid in the adherence of one layer to another layer without the need of using separate adhesives by virtue of the compatibility of the materials in that layer to the first and second layers. In some embodiments, adhesive layers comprise materials found in both the first and second layers. The adhesive layer may suitably be less than 10 percent and preferably between 2 percent and 10 percent of the overall thickness of the multilayer film. Adhesive resins are often more expensive than other polymers, so the tie layer thickness is usually kept to a minimum consistent with the desired effect. In one embodiment, a multilayer web comprises a three layer structure with an adhesive layer positioned between and in contact with the first layer and the second layer. In another embodiment, a multilayer web comprises a multilayer structure comprising a first adhesive layer positioned between and in direct contact with the exterior layer and a core oxygen barrier layer and preferably, and optionally, a second tie layer between and in direct contact with the same core oxygen barrier layer and the interior layer (or food contact layer) to produce a five layer film.

Multilayer films and sheets can comprise any suitable number of tie or adhesive layers of any suitable composition. Various adhesive layers are formulated and positioned to provide a desired level of adhesion between specific layers of the film according to the composition of the layers contacted by the tie layers. For example, adhesive layers in contact with a layer comprising polyester, such as PET, preferably comprise a suitable blend of polyolefins with other adhesive polymers. One preferred component of an adhesive layer in contact with a PET polyester layer is EMAC SP 1330 (which reportedly has a density of 0.948 g/cm$^3$, melt index of 2.0 g/10 min, a melting point of 93° C., a softening point of 49° C., and a methyl acrylate (MA) content of 22%). The intermediate layers may also be formed of similar materials as those of the interior and exterior layers.

An additional layer (or layers) of polyamide, polyester, polyethylene, polypropylene, polybutylene, polystyrene, polycarbonate, cyclic olefin copolymer, polyurethane, polyacrylamide, anhydride-modified polymer, acrylate-modified polymer or blends thereof may also be included in the food packaging article.

Optionally, films and sheets of the present disclosure may be subject to a variety of irradiative treatments. In the irradiation process, the film is subjected to an energetic radiation treatment, such as corona discharge, plasma, flame, ultraviolet, X-ray, gamma ray, beta ray, and high energy electron treatment. These irradiative treatments may be performed for a variety of reasons including, for example, modifying surface characteristics to improve surface adhesion to a variety of substances such as meat or printing ink or to improve internal layer adhesion to ameliorate intralayer adhesion and avoid undesirable delamination. An important known use of irradiation is to induce crosslinking between molecules of the irradiated material. The irradiation of polymeric webs to induce favorable properties such as crosslinking is well known in the art and is disclosed in U.S. Pat. No. 4,737,391 (Lustig et al.) and U.S. Pat. No. 4,064,296 (Bornstein et al.), which are hereby incorporated by reference in their entireties. Bornstein et al. disclose the use of ionizing irradiation for crosslinking one or more polymers present in the web. Post-irradiation is described in U.S. Pat. No. 4,737,391 (Lustig et al.). An advantage of post-irradiation is that a relatively thin film is treated instead of the relatively thick primary tube, thereby reducing the power requirement for a given treatment level. Alternatively, crosslinking may be achieved by addition of a chemical crosslinking agent or by use of irradiation in combination with a crosslinking modifier added to one or more of the layers, as for example described in U.S. Pat. No. 5,055,328 (Evert et al.).

In general, the food packaging article may be in the form of a monolayer or multilayer web having a total thickness of less than about 10 mils, more preferably the web has a total thickness of from about 0.5 to 10 mils (12.7 to 254 microns ($\mu$)). Advantageously, many embodiments may have a thickness from about 1 to 5 mil, with certain typical embodiments being from about 1.5 to 3 mil. For example, entire single or multilayer films or any single layer of a multilayer film can have any suitable thicknesses, including 1, 2, 3, 4, 5, 6, 7, 8, 9, or 10 mils or any increment of 0.1 or 0.01 mil therebetween. Thicker and thinner films are also provided. Although suitable webs for packaging foodstuffs as thick as 4 mil (101.6 microns) or higher, or as thin as 1 mil (25.4 microns) or less may be made, it is expected that the most common webs will be between about 1.5 to 3 mil (38 to 76 microns). Especially preferred for use as films for food packaging are films where the multilayer films have thicknesses of between about 2 to 3 mil (50.8 to 76.2 microns). Such films may have good abuse resistance and machinability. The food packaging article may be in the form of a monolayer or multilayer sheet having a total thickness of at least 10 mil, more preferably, the sheet has a total thickness of from about 10 to 50 mil, most preferably the sheet has a total thickness of from about 10 to 30 mil.

Non-limiting examples of various preferred multilayer web configurations include the following structures:

Abuse Resistant (Exterior)/O$_2$ Barrier/Food Contact & Sealant (Interior);

Abuse Resistant (Exterior)/Core/O$_2$ Barrier/Core/Sealant (Interior);

Abuse Resistant (Exterior)/Tie/Core/O$_2$ Barrier/Core/Sealant (Interior);

Abuse Resistant (Exterior)/Tie/Core/O$_2$ Barrier/Core/Tie/Sealant (Interior);

Abuse Resistant (Exterior)/Core/Tie/O$_2$ Barrier/Tie/Core/Sealant (Interior);

Abuse Resistant (Exterior)/Tie/O$_2$ Barrier/Tie/Sealant (Interior);

Abuse Resistant (Exterior)/Nylon Core/O$_2$ Barrier/Core/Sealant (Interior);

Abuse Resistant (Exterior)/Nylon Core/O$_2$ Barrier/Nylon Core/Sealant (Interior);

Abuse Resistant (Exterior)/Tie/Core/O$_2$ Barrier/Nylon Core/Sealant (Interior); and Abuse Resistant (Exterior)/Tie/Core/O$_2$ Barrier/Nylon Core/Tie/Sealant (Interior)

Some examples provide a 3, 4, 5, 6, 7, 8, 9, or more layer coextruded web with desirable levels of abuse resistance and oxygen barrier in a multilayer web structure.

Figure 4:
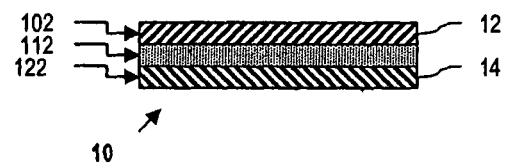
FIG. 4 shows a cross-sectional schematic of a first exemplary multilayer film.

Returning now to the drawings, FIG. 4 discloses an example of a three-layer web structure embodiment of the present disclosure generally designated at reference numeral 10. This embodiment is directed to a multilayer composite comprising an outer layer 12 that is an exterior layer 102 comprising a material such as a polyolefin, PET or a nylon and an outer layer 14 that is a sealant layer 122, each joined to opposite sides of a core tie oxygen barrier layer 112 comprising, for example, EVOH. The multilayer web 10 which may be heat shrinkable or not is designed to be used in the packaging of food products and can be used, for example, to overwrap a tray or in a vacuum skin package.

Figure 5:
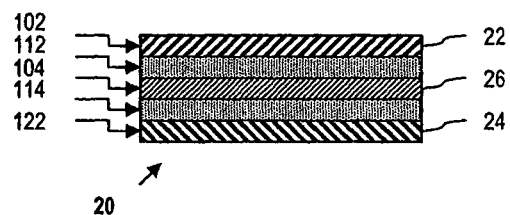
FIG. 5 shows a cross-sectional schematic of a second exemplary multilayer film.

Referring now to FIG. 5, a cross section of an example of a five layer oxygen barrier web is depicted with web 20 having an exterior surface layer 22 that is an abuse resistant layer 102 joined by a first tie layer 112 to a core and barrier polyamide layer 26 comprising one or more nylon polymers 104; the other side of core layer 26 is joined by a second tie layer 114 to an interior surface layer 24 which is a sealant layer 122.

Figure 6:
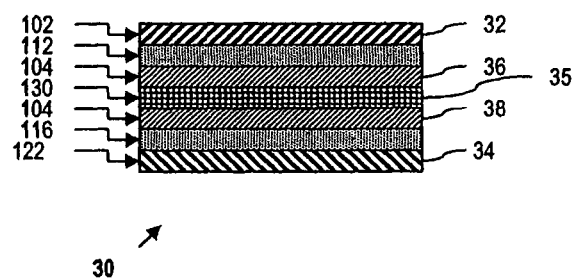
FIG. 6 shows a cross-sectional schematic of a third exemplary multilayer film.

Referring now to FIG. 6, a cross-section of an example of a seven layer film 30 is depicted. Web 30 may comprise an exterior layer 32 that is an abuse resistant layer 102 having high gloss and good printability which is in direct contact with a first tie layer 112 and connected thereby to a first core polyamide layer 36 comprising one or more nylon polymers 104. Nylon layer 36 is in direct contact with an oxygen barrier layer 35 comprising, for example, EVOH 130. Similarly, the other side of the oxygen barrier layer 35 is joined to a second core polyamide layer 38 comprising one or more nylon polymers 104, the other side of which is joined to a second tie layer 116. The interior layer 34 is a food contact layer 122 which may also be heat sealable and which comprises a polyethylene, such as a ULDPE. The food contact sealant layer is joined to the second tie layer 116. Preferably all seven layers are coextruded, but they may also be formed by dispersion coating, emulsion coating, solution coating, lamination (such as extrusion lamination, thermal lamination, adhesive lamination, dry bond lamination, solventless lamination, coating lamination), extrusion coating or a combination thereof.

First tie layer 112 promotes or provides adhesion between an abuse resistant layer 102, which is an exterior layer 32, and a core polyamide layer 104. Similarly, tie layer 116 promotes or provides adhesion between a second polyamide layer 38 and a food contact layer 122, which is an interior layer 34. Tie layers 112 and 116 may be identical or different from each other and may include a wide range of anhydride/grafted polyolefins including those based on ethylene vinyl acetate copolymer, polypropylene, low density polyethylene, linear low density polyethylene and very low density polyethylene. Preferably, the compositions of tie layers are based on linear low density polyethylene or plastomers such as metallocene catalyzed polyethylene. Exemplary tie layer resins are manufactured by Equistar Chemical Company under the trade name Plexar®.

Some embodiments provide multilayer, easy opening, oxygen barrier casings or food package lidding substrates formed from multilayer webs that preferably are at least partially coextruded and more preferably fully coextruded. Optionally, though not shown, the web of FIG. 6 may be thermally or adhesively laminated to a polypropylene semi-rigid or rigid web monolayer to be used to form a semi-rigid or rigid tray. The multilayer web provides appropriate oxygen barrier and heat sealable characteristic to the monolayer.

Figure 7:
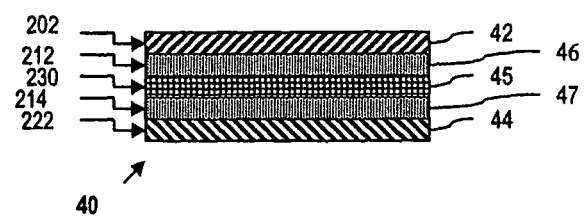
FIG. 7 shows a cross-sectional schematic of a fourth exemplary multilayer film.

Referring now to FIG. 7, a cross-sectional view is depicted of an example of a five layer laminated rigid or semi-rigid web 40 for use in an oxygen barrier package comprising an exterior surface layer 42, which is preferably a polyester layer 202, that is press laminated to an adhesive primed barrier layer 46, which is preferably a PVDC layer 212. The PVDC layer 212 is rotogravure coated onto a three-layer blown web. The coextruded, three-layer blown web includes an outer layer 45 preferably comprising a polyolefin 230 such as a blend of polyethylenes ULDPE and LLDPE, a core layer 47, preferably comprising a blend of EVA and PB, and a sealant surface layer 44, preferably comprising a blend of EVA and LLDPE. The interior surface layer 44 is a heat sealable layer 222. In yet another embodiment of the invention, the PVDC coated three-layer blown web of the embodiment of FIG. 7 is replaced with a six-layer structure having an EVOH oxygen barrier layer sequenced as follows: outer layer/tie/EVOH/tie/core/sealant layer structure.

Other examples of food packaging articles include U.S. Pat. Nos. 6,514,583; 4,801,486; Re35,285; 4,755,403; 6,299,984; 6,221,470; 6,858,275; 4,755,419; 5,834,077; 6,610,392; 6,287,613; 6,074,715; 6,511,568; 6,753,054; 4,610,914; 4,457,960; 6,749,910; 6,815,023; 5,593,747; 5,382,470; and 6,565,985, as well as published U.S. Patent Application No. US 2005/0129969, which are incorporated herein by reference.

In view of the present disclosure it will be appreciated that a person skilled in the art may without undue experimentation include or exclude various materials or combinations thereof to achieve commonly desired functionalities. For example, various additives may be included or excluded in the polymers utilized in one or more of the layers of the food packaging article or coated thereon. Antioxidants, antiblock additives, polymeric plasticizers, acid, moisture or gas (such as oxygen) scavengers, slip agents, colorants, dyes, pigments, flavorants, odorants, organoleptic agents, coefficient of friction modifying agents, lubricants, surfactants, encapsulating agents, pH modifying agents, meat spoilage indicators, film forming agents, emulsifiers, polyphosphates, humectants, drying agents, antimicrobial agents, chelating agents, binders, starches, polysaccharides or a combination thereof may be added to one or more web layers of the web or it may be free from such added ingredients as desired to achieve functional goals. Examples of particular compositions that may be added or excluded include α-tocopherol, alcohol, annatto, ascorbic acid, beet powder, BHA, BHT, bixin, caramel, carmine, carotenoid pigment, casein, cochineal, cyclodextrin, dextrin, erucamide, ethoxylated mondiglycerides, fluoroelastomer, food grade oil, glycerin, lecithin, liquid smoke, nisin, norbixin, pediocin, polysorbate, potassium chloride, rosemary extract, shellac, sodium chloride, sodium erythorbate, starch, trisodium polyphosphate, turmeric, water, water soluble cellulose ether and zein. Examples of coloring agents include methionine, cysteine and cooked cured meat pigments. If the exterior layer is corona treated, slip agent may be used or not, but it will contain or be coated with an antiblock powder or agent such as silica or starch. Preferred processing aids for use in the outer layer of the web may include one or more of fluoroelastomers, stearamides, erucamides, and silicates. Processing aides are typically used in amounts less than 10 percent, less than 7 percent and preferably less than 5 percent of the layer weight. Various polymer modifiers may be incorporated for the purpose of improving toughness, orientability, extensibility and/or other properties of the web. Other modifiers which may be added include modifiers which improve low temperature toughness or impact strength and modifiers which reduce modulus or stiffness. Exemplary modifiers include styrene-butadiene, styrene-isoprene, and ethylene-propylene copolymers. Other additives known to one skilled in the art can be included. These additives can be added directly to the food product or to the packaging web, either incorporated within or coated or dusted on the surface. Examples of other additives include monosodium glutamate, salt, cereal, soybean flour, soy protein concentrate, lactose, corn syrup solids, antimycotics (which suppress the growth of yeasts and molds), antibiotics, sugar, glycerol, lactic acid, ascorbic acid, erythorbic acid, α-tocopherol, phosphates, rosemary extract and sodium benzoate.

Another category of additives that may be, and which preferably are, included in the food packaging article are myoglobin blooming agents.

Myoglobin Blooming Agent

In one embodiment, the food packaging article comprises a myoglobin blooming agent in an amount effective to promote or preserve the desirable appearance or color of the myoblogin-containing food product.

A "myoglobin blooming agent" refers to any agent (or precursor thereof) that binds to or interacts with any undenatured myoglobin-containing structure (including but not limited to deoxymyoglobin, oxymyoglobin, metmyoglobin, carboxymyoglobin, and nitroxymyoglobin) present in a fresh meat product to produce or preserve a desired color, such as a red color indicative of fresh meat. The myoglobin blooming agent may also interact or cause an interaction with hemoglobin present in a meat product so as to produce, maintain or enhance (i.e., "fix") a desired color. Thus, the myoglobin blooming agent is not a color additive but a color fixative.

In one embodiment, the myoglobin blooming agent is a "nitric oxide donating compound" ("NO donor") that provides a nitric oxide (NO) molecule that binds to the myoglobin present in a meat product so as to maintain or promote a reddening or blooming or other favorable coloration of the meat product. A nitric oxide donating compound releases nitric oxide or is a precursor (e.g., nitrate which acts as an intermediate leading to the formation of nitric oxide which binds to a myoglobin molecule in a meat product). Examples of nitric oxide donating compounds include nitrosodisulfonates including for example, Fremy's salt [$NO(SO_3Na)_2$ or $NO(SO_3K)_2$]; inorganic nitrates ($MNO_3$) where suitable counter ions ($M^+$) include alkali metals (e.g., sodium, potassium), alkaline earth metals (e.g., calcium), transition metals, protonated primary, secondary, or tertiary amines, or quaternary amines, or ammonium, and including, for example, saltpeter; and inorganic nitrites ($MNO_2$) where suitable counter ions ($M^+$) include alkali metals (e.g., sodium, potassium), alkaline earth metals (e.g., calcium), transition metals, protonated primary, secondary, or tertiary amines, or quaternary amines, or ammonium.

Other suitable nitric oxide donating compounds that may act as myoglobin blooming agents are disclosed in U.S. Pat. No. 6,706,274 to Herrmann et al. (filed Jan. 18, 2001); U.S. Pat. No. 5,994,444 to Trescony et al. (filed Oct. 16, 1997), and U.S. Pat. No. 6,939,569 to Green et al. (filed Jun. 18, 1999), as well as published U.S. Patent Application No. US2005/0106380 by Gray et al. (filed Nov. 13, 2003), all of which are hereby incorporated by reference herein. Optionally, the myoglobin blooming agents can contain materials that promote the conversion of other materials to NO, such as nitrate reductase or nitrosothiol reductase catalytic agents, including the materials described in WIPO Publication No. WO 02/056904 by Meyerhoff et al. (filed Jan. 16, 2002), which is incorporated herein by reference.

Other examples of nitric oxide donating compounds include organic nitroso compounds (containing a —NO functional group attached to carbon) including 3-ethyl-3-nitroso-2,4-pentanedione; organic nitro compounds (containing a —$NO_2$ functional group attached to carbon) including nitroglycerine and 6-nitrobenzo[α]pyrene; organic nitrates (—O—$NO_2$) including ethyl nitrate, glyceryl mono, di or trinitrate, pentaerythritol tetranitrate, erythrityle tetranitrate, isosorbide mono or dinitrate, and trolnitrate; and organic nitrites.

Other examples of nitric oxide donating compounds include O-nitrosylated compounds (—O—NO) including alkyl nitrites such as butyl nitrite, amyl nitrite, dodecyl nitrite and dicyclohexylamine nitrite; S-nitrosylated compounds (—S—NO) also known as nitrosothiols including S-nitrosothioglycerol, S-nitroso-penicillamine, S-nitrosoglutathione, glutathione, S-nitroylated derivatives of captopril, S-nitrosylated-proteins, S-nitrosylated-peptides, S-nitrosylated-oligosaccharides and S-nitrosylated-polysaccharides; and N-nitrosylated compounds (—N—NO) including N-nitrosamines, N-hydroxy-N-nitrosoamines and N-nitrosimines.

Additional examples of nitric oxide donating compounds include nonoate compounds which include the functional group —N(O)—NO (also referred to in the art as N-oxo-N-nitroso compounds, N-hydroxy-N'-diazenium oxides, diazeniumdiolates and NONOates) including 3,3,4,4-tetramethyl-1,2-diazetine 1,2-dioxide.

Further examples of nitric oxide donating compounds include transition metal/nitroso complexes including sodium nitroprusside, dinitrosyl iron thiol complexes, iron-sulfur cluster nitrosyls, ruthenium nitrosyls, nitroso/heme/transition metal complexes, and nitroso ferrous protoporphyrin complexes; furoxans including 1,2,5-oxadiazole N-oxide; benzofuroxans; oxatriazole-5-imines including 3-aryl-1,2,3,4-oxatriazole-5-imine; sydnonimines including molsidomine; oximes including cyclohexanone oxime; hydroxylamines, N-hydroxyguanidines, and hydroxyureas.

Nitric oxide donating compounds may donate one molecule of nitric oxide or multiple nitric oxide molecules. In some aspects the nitric oxide donating compound may be a polymeric material which contains several nitric oxide donating sites, and can thereby release multiple molecules of nitric oxide. Preferably, the nitric oxide is released from the polymeric chain. For example, U.S. Pat. No. 5,525,357, which is hereby incorporated by reference herein, describes a polymer with a nitric oxide-releasing functional group bound to the polymer. U.S. Pat. No. 5,770,645, which is hereby incorporated by reference herein, describes a polymer in which $NO_x$ is covalently bound to a polymer by a linking group. U.S. Pat. No. 6,087,479, which is hereby incorporated by reference herein, describes synthetically derived polymeric materials which are derivatized to include nitric oxide adducts. It is to be understood that polymeric materials which contain a nitric oxide donating compound or nitric oxide donating functional group chemically bound to the polymer chain are within the scope of the present invention.

Other myoglobin blooming agents within the scope of the present invention include inorganic cyanides (MCN) where suitable counter ions ($M^+$) include alkali metals (e.g., sodium, potassium), alkaline earth metals (e.g., calcium), transition metals, protonated primary, secondary, or tertiary amines, or quaternary amines, or ammonium; inorganic fluorides (MF) where suitable counter ion ($M^+$) include alkali metals (e.g., sodium, potassium), alkaline earth metals (e.g., calcium), transition metals, protonated primary, secondary, or tertiary amines, or quaternary amines, or ammonium; isothiocyanates including mustard oil; bacterial cultures that fix nitrogen to provide a source of nitrogen oxide including xanthine oxidase, nitrate reductases, nitrite reductases; betanine; erythrocine; and cochineal extracts.

Other myoglobin blooming agents include nitrogen heterocycles and derivatives. Examples of suitable nitrogen heterocycles include pyridines, pyrimidines (for example dipyridamole), pyrazines, triazines, purines (for example nicotinamide), nicotinates, niacin (also known as nicotinic acid), isoquinolines, imidazoles and derivatives and salts thereof. It is to be understood that these nitrogen heterocycles may be substituted or unsubstituted. For pyridines and isoquinolines, 3-carbonyl substituted compounds are preferred. In one embodiment, the nitrogen heterocycle is a pyridine, pyrimidine or imidazole. In another embodiment, the nitrogen heterocycle is an alkali or alkaline earth metal salt or ester of nicotinic acid which may include such esters as methyl nicotinate, ethyl nicotinate, propyl nicotinate, butyl nicotinate, pentyl nicotinate, hexyl nicotinate, methyl isonicotinate, isopropyl isonicotinate, and isopentyl isonicotinate. In another embodiment, the nitrogen heterocycle is an alkali or alkaline earth metal salt or ester of nicotinamide. In another aspect, the nitrogen heterocycle is pyridine, pyrimidine, histidine, N-acetyl histidine, 3-butyroylpyridine, 3-valeroylpyridine, 3-caproylpyridine, 3-heptoylpyridine, 3-capryloylpyridine, 3-formylpyiridine, nicotinamide, N-ethylnicotinamide, N,N-diethylnicotinamide, isonicotinic acid hydrazide, 3-hydroxypyridine, 3-ethyl pyridine, 4-vinyl pyridine, 4-bromo-isoquinoline, 5-hydroxyisoquinoline, or 3-cyanopyridine.

Myoglobin blooming agents also include any compound which acts as a ligand for myoglobin and leads to the formation of the desirable color, or any compound which acts as a substrate leading to the formation of such a ligand. For example, the myoglobin blooming agent can be a carbon monoxide donating compound. Carbon monoxide is known to complex with the heme pocket of myoglobin to form a desirable appearance in meat. A carbon monoxide donating compound is any compound that releases carbon monoxide or acts as a substrate leading to the formation of carbon monoxide. Alternatively, the blooming agent can be a sulfur monoxide (SO) donating compound, a nitrous oxide ($N_2O$) donating compound, an ammonia ($NH_3$) donating compound or a hydrogen sulfide donating compound. Such compounds donate the specified ligand or act as a substrate leading to the formation of the specified ligand. Compounds include ligand/heme/transition metal complexes, and ligand ferrous protoporphyrin complexes, including for example, carbon monoxide/heme/transition metal complexes, and carbon monoxide ferrous protoporphyrin complexes. Carbon monoxide donating compounds, sulfur monoxide donating compounds, nitrous oxide donating compounds and hydrogen sulfide donating compounds include polymeric materials with the appropriate donating functional group chemically bound to the polymer chain.

The myoglobin blooming agent is preferably present in a desired concentration in contact with a meat product. The myoglobin blooming agent may be present in or on any layer of the food packaging article (via spraying, dusting or incorporation within the layer itself) but also must be able to migrate to the portion of the transparent portion of the interior surface of the food packaging article in contact with the portion of the surface of the food product. This interior surface, which, in some embodiments is the food contact layer, preferably contains a blooming agent in a concentration high enough to produce or preserve a desirable appearance in a meat product, including but not limited to causing the surface of the meat product to have a visible red hue which is apparent at least 10 days, preferably at least 21 days, and more preferably at least 28 days, after packaging the food product in a vacuum environment. This desirable red hue may vary from a light cherry red to a dark red and desirably may form early after packaging (typically five days or less) and remain for many days and weeks throughout a large portion of the time when the meat nutritious and healthy for consumption.

The myoglobin blooming agent (MBA) preferably will contact the meat surface in an amount sufficient to produce a desired red color which preferably does not penetrate to an undesirable depth of the food thickness under reduced oxygen conditions. (This color may take awhile to develop, e.g., 1 to 5 days.) Thus, the food contact surface of the food packaging article preferably contains a myoglobin blooming agent in a concentration high enough to produce and/or maintain a desired surface coloration of a fresh meat product, but low enough to prevent undesirable extension of the color into the body of the meat product. Preferably, the myoglobin blooming agent is present on a food contact surface in a concentration that is sufficient upon contact with a meat surface to convert at least 50% of the targeted myoglobin molecules to a desired ligand binding state. The available amount or concentration of myoglobin blooming agent is preferably selected to bind ligands producing desirable coloration of the meat in the outermost ¼-inch, or ⅙, ⅛, ⅒, 1/12, 1/16 or 1/20-inch or less of the meat product, although deeper penetrations may be accomplished if desired. For example, a nitric oxide donating myoglobin blooming agent is desirably present in a concentration sufficient to convert at least 50% of the myoglobin molecules on the contacting meat surface to nitric oxide myoglobin. Additionally, preferably, the myoglobin blooming agent is desirably present in a concentration such that the food product has less then 0.0002 percent by weight residual myoglobin bloomjing agent after 5 days following packaging. Preferably there is less than 0.00067 percent nitrite, nitrate or combinations thereof where these MBAs are used.

Beneficially, the MBA may be present on the food contact surface (or on the myoglobin-containing food product surface) in an amount of from about 0.01 to 3 to 5 to 10 µmoles/in$^2$ and in increments of 0.1 µmole thereof. Greater or lesser amounts of MBA may be used, and the color intensity may thereby be varied depending upon the relative amount of intrinsic myoglobin present in the meat.

The myoglobin blooming agent is preferably evenly or uniformly distributed on (or migratable to) the surface of the food contact surface. The minimum amount required to cause the desired coloration depends on the concentration of myoglobin present in the food product. For example, beef products containing 10 mg/g of myoglobin may require 10 times more myoglobin blooming agent than poultry products containing 1 mg/g of myoglobin. Also, if the desired depth of penetration is 0.25 inch, then, in order to affect all of the myoglobin molecules (molecular weight of myoglobin is about 17,000 g/mole) in 1 square inch of beef to a depth of 0.25 inch, there would have to be at least 2.4 µmole (micromoles) of the myoglobin blooming agent available for transfer via the surface of 1 square inch of film (one square inch of beef to a depth of about 0.25 inch equals about 4.1 grams of meat (specific gravity of 1 g/cc)). Sodium nitrite as a preferred myoglobin blooming agent has a molecular weight of 69 g/mole. Thus 2.4 µmole of NaNO$_2$ weighs 0.166 mg and the total amount of myoglobin in 4.1 grams of meat containing 10 mg/g is 41 mg. Beef meat typically contains myoglobin at a level of 3 to 20 mg/g. The preferred amount of myoglobin blooming agent that is present in the article for beef provides 0.36 to 4.8 µmoles/in$^2$. Similarly, pork contains myoglobin at a level of 1 to 5 mg/g. A packaging article for this application would preferably provide 0.12 to 1.20 µmoles/in$^2$ MBA. For poultry having less than 1 mg/g of myoglobin, the packaging article preferably would provide less than 0.12 µmoles/in$^2$, e.g., 0.06 µmoles/in$^2$ of MBA. An article using sodium nitrite (MW=69 g/mole) as a myoglobin blooming agent would preferably provide 0.025 to 0.166 mg/in$^2$ for beef meat products; 0.008 to 0.050 mg/in$^2$ for pork meat products; and less than 0.008 mg/in$^2$ for poultry meat products. An article providing 0.17 mg/in$^2$ would be suitable for a variety of types of fresh meat.

A higher amount of myoglobin blooming agent may be preferred for darker colored muscles that may contain higher levels of myoglobin. When the myoglobin blooming agent is incorporated into the polymer matrix that comprises the food contact layer of a monolayer or multilayer packaging film or sheet, only a portion of it is able to effectively migrate from the film surface into the product's surface to interact with the myoglobin. Web inclusion levels of up to 20 times or higher of the amount required for effective color fixing are anticipated.

Thus, the amount of myoglobin blooming agent per unit area of the food contact surface can be selected to provide a desired food coloration of a packaged fresh meat product surface. For example, the food contact layer may include about 0.005 to about 0.900 mg/in$^2$ of a myoglobin blooming agent such as sodium nitrite, preferably about 0.010 to about 0.400 mg/in$^2$ and most preferably about 0.100 to about 0.300 mg/in$^2$. For beef products, a food contact layer may include, e.g., about 0.200 to about 0.250 mg/in$^2$, for example, of a sodium nitrite myoglobin blooming agent, while lower concentrations, such as about 0.100 to about 0.150 mg/in$^2$, may be used for pork products.

In one embodiment of the invention, it is contemplated that a food contact layer may comprise about 1,000 ppm (0.1 percent by weight) to about 50,000 ppm (5.0 percent by weight) of a myoglobin blooming agent, more preferably about 5,000 ppm (0.5 percent by weight) to about 25,000 ppm (2.5 percent by weight), and most preferably about 7,500 ppm (0.75 percent by weight) to about 20,000 ppm (2 percent by weight). Typically, a food contact layer comprises about 1.5 percent by weight to about 2.0 percent by weight or less (15,000 ppm-20,000 ppm) of a nitrite salt for packaging a fresh ground beef product or about 0.75 percent by weight to about 1.5 percent by weight of a nitrite salt for packaging a fresh pork meat product. Amounts in a range of 0.75 to 2.25 percent by weight may be advantageously employed for a variety of meats.

Myoglobin blooming agents and solutions or dispersions thereof may be colorless or, such as sodium nitrate, may have an intrinsic pale yellow color (i.e., may not be totally colorless); but this color does not typically have sufficient intensity itself to act as a significant colorant or color additive. This does not preclude either the use of colored myoglobin blooming agents which impart an intrinsic color or the combination of a myoglobin blooming agent in combination with one or more natural and/or artificial colorants, pigments, dyes and/or flavorants such as annatto, bixin, norbixin, beet powder, caramel, carmine, cochineal, turmeric, paprika, liquid smoke, erythrosine, betanine, one or more FD&C colorants, etc.

In one embodiment, a synergist may be used in combination with a myoglobin blooming agent to accelerate the formation of the desirable appearance or bloom of a food product, in particular a meat product. In other words, the time necessary for the desirable appearance or bloom to take effect when the myoglobin blooming agent is used with the synergist is less than the time required for the desirable appearance or bloom to take effect when the myoglobin blooming agent is used without the synergist. In other aspects, the synergist may enhance the desirable appearance or bloom of a food product. In still other aspects, the synergist may prolong the amount of time that desirable color or bloom lasts. Preferably, the synergist is a food grade additive.

A variety of synergists may be used in the present invention including acidulants, basifying agents, reducing agents, antioxidants, oxygen scavengers, and postmortem muscle metabolism modifiers. Another synergist includes physical treatment by radiant energy. Synergists of the present invention may act by one or more mechanisms and or may be classified according to one or more of the groups listed above.

One group of synergists is acidulants. An acidulant refers to any compound which lowers the pH of a food product. Preferably, the acidulant is a food grade acidulant. Without wishing to be bound by theory, acidulants are believed to accelerate conversion of nitrate and nitrite to nitric oxide, and thereby, facilitate the formation of nitroxymyoglobin. As such, any compound which accelerates the conversion of nitrite or nitrate to nitric oxide is considered an acidulant within the scope of the present invention. Examples of acidulants include organic acids such as ascorbic acid, erythorbic acid, citric acid, lactic acid, benzoic acid; glucono delta lactone; and acidic phosphates such as monobasic monophosphates ($H_2PO_4^-$), monobasic diphosphates ($H_3P_2O_7^-$), dibasic diphosphates ($H_2P_2O_7^{2-}$), monobasic triphosphates ($H_4P_3O_{10}^-$), and dibasic triphosphates ($H_3P_3O_{10}^{2-}$) where suitable phosphate counterions include alkali metals (e.g., sodium, potassium), alkaline earth metals (e.g., calcium), protonated primary, secondary, or tertiary amines, quaternary amines, and ammonium.

A basifying agent refers to any compound which increases the pH of a meat product. Without wishing to be bound by theory, the decrease in pH which occurs post-mortem in meat, reduces mitochondrial activity, OCR and MRA. The result of the decrease in pH may have a positive effect on myoglobin blooming by oxygen, a negative effect with myoglobin blooming by nitric oxide, and no effect with myoglobin blooming by carbon monooxide. The natural pH of meat is between about 5.8 to about 6.2. Maintaining the pH of meat above about 5.5 is believed to restore mitochondrial activities, thereby accelerating reduction of metmyoglobin to facilitate binding of a ligand, such as nitric oxide. As such, any compound which restores or enhances mitochondrial activities is within the scope of the present invention. Examples of basifying agents include bicarbonates ($HCO_3^-$), carbonates ($CO_3^{2-}$), basic phosphates such as dibasic phosphate ($HPO_4^{2-}$), tribasic phosphates ($PO_4^{3-}$), tetrabasic diphosphates ($P_2O_7^{4-}$), pentabasic triphospates ($P_3O_{10}^{5-}$) wherein suitable counterions include alkali metals (such as sodium, potassium), alkaline earth metals (such as calcium), protonated primary, secondary, or tertiary amines, quaternary amines, and ammonium. Preferably the basifying agent is sodium tripolyphosphate ($Na_5P_3O_{10}$), also referred to as sodium triphosphate pentabasic.

In some aspects, the basifying agent acts as a buffering agent, buffering the pH of the meat at or greater than pH 5.5, preferably between about 5.5 and about 8.0, more preferably between about 5.8 and about 6.2. Examples of buffering agents include phosphates as discussed above and bicarbonates, including sodium bicarbonate and potassium bicarbonate, where suitable counterions for either phosphates or bicarbonates are as discussed above for basifying agents. A method of using a sodium bicarbonate solution to improve meat color is disclosed in U.S. Pat. No. 6,020,012 to Kauffman et al., the disclosure of which is hereby incorporated by reference. In some aspects, it may be desirable to apply or inject the basifying or buffering agent to the meat immediately after slaughter.

Other synergists include reducing agents. A reducing agent refers to any compound which prevents or mitigates oxidation or otherwise reduces the oxidation state of a compound or atom, or which reduces the initial browning of a meat product. Reducing agents can act in a variety of ways to improve the performance characteristics of a myoglobin blooming agent. For example, oxymyoglobin is known to oxidize to metmyoglobin which has an undesirable brown color. A reducing agent could prevent or mitigate the oxidation of oxymyoglobin to metmyoglobin or decrease the rate of oxidation. In other aspects, the reducing agent may mitigate the agent which is oxidizing oxymyoglobin to metmyoglobin. Reducing agents can also be used to reduce nitrites, nitrates or other nitric oxide donating compounds to nitric oxide. Examples of reducing agents include antioxidants, peroxide reducing agents, peroxynitrite reducing agents, nitrite reducing agents, nitrate reducing agents and oxygen scavengers.

Antioxidants refer to any compound which prevents, mitigates, or otherwise interferes with oxidation of myoglobin. Without wishing to be bound by theory, antioxidants are believed to reduce oxidation of myoglobin to metmyoglobin thereby reducing initial browning and bloom time. As such, any compound which reduces initial browning is also intended to be within the scope of the present invention. Examples of antioxidants include salts of ascorbic acid, salts of erythorbic acid, sodium sulfite, sodium benzoate, alpha tocopherol (vitamin E), butylated hydroxyanisole (BHA), butylated hydroxytoluene (BHT), Rosemary extract, and cure accelerators. Salts of ascorbic acid or erythorbic acid may comprise any suitable counterion for the carboxylate functionality including alkali metals (such as sodium, potassium), alkaline earth metals (such as calcium), protonated primary, secondary, or tertiary amines, quaternary amines, and ammonium. Other examples of antioxidants include reducing sugars such as described in U.S. Pat. No. 2,147,261, the entire disclose of which is hereby incorporated by reference. A reducing sugar is a carbohydrate which can reduce metallic salts, such as copper or silver, in the presence of certain organic salts. Reducing sugars include, for example, starch conversion syrups, dextrose, maltose, levulose, lactose and invert sugar. Preferably the antioxidant is sodium erythorbate.

Other reducing agents include nitrite and/or nitrate reducing agents refer to compounds which reduce or catalyze the reduction of nitrite or nitrate to nitric oxide. Examples of nitrite reducing agents include proteins or enzymes including nitrate reductases, nitrite reductases, and xanthine oxidase; and metal ion ligand complexes of Cu(II), Fe(III), V(III), Cr(III) and Ti(III) where suitable ligands, include dibenzo[e,k]-2,3,8,9-tetraphenyl-1,4,7,10-tetraaza-cyclododeca-1,3,7,9-tetraene, dibenzo[e,k]-2,3,8,9-tetramethyl-1,4,7,10-tetraaza-cyclododeca-1,3,7,9-tetraene, and dibenzo[e,k]-2,3,8,9-tetraethyl-1,4,7,10-tetraaza-cyclododeca-1,3,7,9-tetraene. The reducing agent may also be a peroxynitrite reducing agent. A peroxynitrite reducing agent is any compound that reduces, catalyzes the reduction or otherwise aids in the reduction of peroxynitrite to nitric oxide. An example of a peroxynitrite reducing agents includes glutamic acid.

Other synergists include oxygen scavengers. An oxygen scavenger is any compound that reduces or eliminates residual oxygen in the atmosphere around the meat product, in the meat, or in particular, on the meat surface. An oxygen scavenger may eliminate oxygen by physical means such as absorbing and retaining oxygen, or by converting or assisting in the conversion of oxygen to another species. Examples of oxygen scavengers include iron sulfate and glucose oxidase/catalase.

Other synergists include postmortem muscle metabolism modifying agents. A postmortem muscle metabolism modifying agent is any compound that increases metmyoglobin reducing activity (MRA) or acts as a substrate leading to increased metmyoglobin reducing activity. Reducing coenzymes called metmyoglobin reductases present in meat convert metmyoglobin back to deoxymyoglobin, and their activity is called "MRA." As discussed previously, metmyoglobin has an undesirable brown color, whereas oxymyoglobin as a desirable red color. In addition, improved MRA activity facilitates the consumption of residual oxygen and reduction of $NO_2$ to nitric oxide. As such, any compound which restores, enhances, or improves MRA activity, accelerates the consumption of oxygen, or the reduction of $NO_2$ to nitric oxide is within the scope of the present invention. Examples of metmyoglobin reducing activity enhancing agents include 1,6-diphosphate which is used by mitochondria in postmortem metabolism and inorganic lactates where suitable counterions are selected from the group consisting of alkali metals (such as sodium, potassium), alkaline earth metals (such as calcium), protonated primary, secondary, or tertiary amines, quaternary amines, and ammonium.

Other synergists include physical treatments to the meat product. Physical treatments by radiant energy may include, but are not limited to, for example, exposing meat to heat, infared light, visible light, ultraviolet light, ionizing radiation and combinations thereof. For example, the meat product can be exposed to heat such as a specific temperature range and for a specific time after the myoglobin blooming agent has come in contact with the meat surface. For example, the meat may be exposed to infrared light, visible light or ultraviolet light for a suitable amount of time. Alternatively, the meat may be exposed to a temperature range for a suitable amount of time. Fresh meat is often maintained below about 35° F., more specifically between about 28-32° F. Below about 28° F., meat often begins to freeze. For a synergistic effect with heat as a synergist, meat is preferably exposed to greater than about 35° F., as measured at the surface of the meat, preferably between about 35° F. and about 50° F., more preferably between about 35° F. and about 40° F.

Various combinations of myoglobin blooming agents and synergists are possible. For example, one or more myoglobin blooming agents may be used in combination with one or more synergists. In some instances, there may be some combinations of one or more myoglobin blooming agents with one or more synergists which are more preferable than others. In other instances, depending on the mechanism of action of the synergists, it may be desirable to premix the myoglobin blooming agent and synergist. In other aspects, it may be preferable to segregate the myoglobin blooming agent and synergist until a desired time.

Shipping the Retail-Sized Portion

Once packaged, the retail-sized portion of the myoglobin-containing food product is shipped or transported to a retail outlet. Shipping may occur via air, rail, over-the-road trucking or various other means. Control of shipping temperatures is necessary. Accordingly, shipping may occur in a refrigerated environment.

The various embodiments of the present disclosure result in increased efficiencies in shipping. The food packaging article contacts at least a portion of the food product, and no gas is added to the packaged food product. Hence, the headspace of the packaged food product is reduced and/or eliminated; and, as compared to current MAP food products, a greater number of finished goods may be shipped in the same shipping compartment.

Displaying the Packaged Retail-Sized Portion

After the packaged retail-sized portion arrives at the retail outlet and the retailer has obtained the packaged food product, the retailer may immediately place the product on a shelf at the retail outlet. As an optional step, the retailer (and/or the shipper and/or the packager/processor) may elect to store the packed food product for a sufficient time to allow a desirable appearance to bloom prior to displaying the packaged retail-sized portion, considering that the MCA and OCR of a myoglobin-containing food product is most active 6 to 10 days postmortem. The retailer need not repackage the retail-sized food product of the present disclosure. Additionally, the retailer need not remove any portion of the food packaging article, including but not limited to the oxygen barrier layer of the food packaging article. There is no need to provide atmospherically added oxygen to the meat surface to cause or maintain the desired red color. The red color has already been maintained and stabilized in accordance with the present invention.

Preferably, the food product is never frozen throughout the distribution or commercialization process until purchase by the retail customer, although it may be kept quite cold near freezing and in some cases at temperatures below 32° F. for preservation purposes.

As packaged in accordance with the present disclosure, the color of the meat can be preserved in a desirable color (such as red for beef or a pinkish red hue for pork) for more than about three days, preferably for 5, 7, 10, 15, 20, 25, 30 or more days. Suitably, at least 5 percent and preferably at least 10 percent, 20 percent, 30 percent, 50 percent or more of the surface of the food packaging article is transparent to allow visual perception of food color and the food surface therethrough after packaging.

To facilitate the increased display-life of the packaged food product, the food packaging article may include indicia communicating information to the consumer. This information may include, but is not limited to, a packed on date, a sell by date, a use by date or various combinations of the three. In accordance with the various embodiments of the method of this disclosure, the sell by date may be 10, 20, 30, 40, 50 or more days following the date on which the retail-sized portions were packaged, or any day subunit thereof e.g. 21 or 28 days, etc.

The desirable appearance of the food product may include a desirable color, such as a reddish hue of a red for beef or a pink for pork. As previously mentioned (and as shown by the failure of the Excel/Kroger program to market a flexible vacuum package of Excel's case-ready beef cuts in the mid-1980's), vacuuming packaging outside of the context of the present disclosure generally results in a purple meat color, and the majority of consumers do not accept the purple color, instead preferring a red hue. this red hue is believed to promote increased (over purple or brown) visibility of the meat surface to consumers so that other meat characteristics are more easily seen such as meat texture, muscle fiber definition, firmness, fat content, marbling, juiciness, etc.

Figure 8:
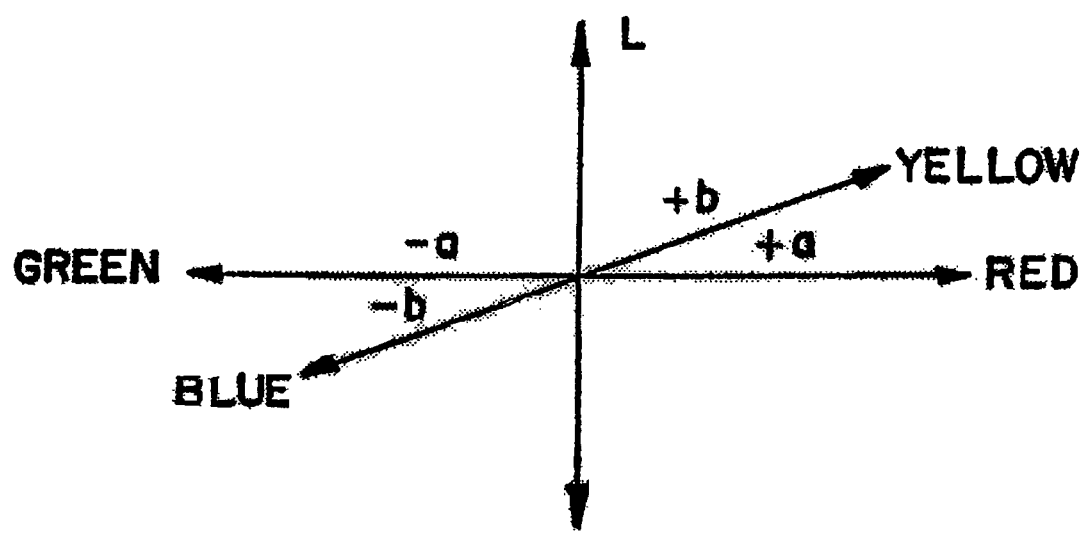
FIG. 8 is a graph representing the three-dimensional L*a*b* color characteristics chart.

In addition to consumer preferences regarding color, colorimetric systems have been developed in an effort to objectively describe how colors are perceived by observers. The International Commission on Illumination (CIE) has, for example, developed a system for objective description of color by light source, object and observer. The CIE developed a standardization of the illuminant and observer data. The color of the object under these standard conditions is identified by tristimulus values X, Y and Z. Each XYZ value is obtained by multiplying the reflectance of the colored sample, the power of the standard illuminant and the calculated amount of each of the three primary colors (red, green and blue) which, when combined, are found through observational tests to be the color equivalent of the object being described. The tristimulus values X, Y, and Z are of somewhat limited value as color specifications because they do not correlate well to visual attributes. As a result, the CIE adopted the use of chromaticity coordinates x, y, and z which are the amounts of each tristimulus value divided by the sum of all three. The CIE chromaticity calculations have been further transformed by the use of the L*a*b* transformation. The L*a*b* system identifies color by lightness or darkness as its L* value. The saturation or amount of dullness or brightness (deviation from gray) a color has, as well as hue or what is commonly called color (blue, green, etc.), are both identified using a* and b* values. The L*a*b* values may be used as coordinates to lay out the color system in a three-dimensional space. Typically, the L* value is shown in the vertical z-direction. The a*b* values are set in the XY plane. In regard to the values, the L* value ranges from 0 (all black) to 100 (all white), the a* value ranges from −128 (green) to +127 (red), and the b* value ranges from −128 (blue) to +127 (yellow). Between these extremes of each value, all colors can be identified. See FIG. 8.

Colorimeters are used to measure L*a*b* values. On such colorimeter is the Konica Minolta BC-10 Baking Contrast Meter, available from Konica Minolta Sensing Americas, Inc. (Ramsey, N.J.). This colorimeter was used in the examples that follow via the following test method:

Step 1: Switch on the Konica Minolta BC-10 Colorimeter

Step 2: Perform the white tile calibration.

Step 3: Wipe off the surface of the food packaging article (such as the multilayer film) with a paper towel to remove condensation.

Step 4: Place the colorimeter on the surface of the film and obtain L*a*b* values 10 times in the same spot; 10 readings reduces the variance from reading to reading). If it is the first measurement, place a tick mark on the surface of the film with a permanent marker so that the same spot can be measured every time.

Step 5: Record the average L*a*b* values of the 10 readings.

Portions of a meat surface containing a relatively high percentage of protein were visually selected for measurement as opposed to portions containing a large fat deposits or bone.

EXAMPLE 1

Four individual packaged boneless beef ribeye steaks were purchased from a retail outlet and stored at 2.1° C. and 40 percent humidity. L*a*b* values were obtained for all 4 packages at Day 1 and 8, as shown in Table 1.

TABLE 1

| Sample | Day | L* | a* | b* | Observed Color |
|---|---|---|---|---|---|
| 1 | 1 | 45.4 | 21.7 | 13.4 | Red |
|   | 8 | 47.8 | 16.2 | 9.0 | Red |
| 2 | 1 | 53.6 | 18.3 | 14.2 | Red |
|   | 8 | 43.9 | 23.2 | 13.9 | Red |
| 3 | 1 | 48.1 | 21.6 | 14.4 | Red |
|   | 8 | 46.7 | 16.9 | 13.1 | Red |
| 4 | 1 | 52.3 | 16.0 | 11.1 | Red |
|   | 8 | 49.5 | 19.3 | 13.3 | Red |

On Day 12, Samples 1, 2 and 3 were opened. The meat from Sample 1 was repackaged as Test 1 in a multilayer barrier pouch with 17,500 ppm NaNO₂ in the sealant layer; the meat from Sample 2 was repackaged as Test 2 in a multilayer barrier pouch with 17,500 ppm NaNO₂ in the sealant layer; and the meat from Sample 3 was repackaged as Control in a multilayer barrier pouch. (Sample 4 was retained for later use.) After repackaging, L*a*b* values were obtained for Test 1, Test 2 and Control 1 at three times on Day 12, two times on each of Day 13, 14 and 15, and one time on Day 17, as shown in Table 2.

TABLE 2

| Sample | Day | Time | L* | a* | b* | Observed Color |
|---|---|---|---|---|---|---|
| Test 1 | Day 12 | 10:30 | 41.0 | 10.7 | 9.4 | Brown |
|  | Day 12 | 12:00 | 44.6 | 7.8 | 11.9 | Brown |
|  | Day 12 | 18:15 | 45.1 | 5.8 | 10.3 | Brown |
|  | Day 13 | 08:30 | 47.1 | 5.2 | 9.7 | Brown |
|  | Day 13 | 17:25 | 45.7 | 6.4 | 9.5 | Brown |
|  | Day 14 | 08:15 | 43.9 | 6.6 | 8.8 | Brown |
|  | Day 14 | 19:15 | 41.5 | 7.0 | 9.5 | Brown |
|  | Day 15 | 08:05 | 39.8 | 8.9 | 8.2 | Brown |
|  | Day 15 | 17:20 | 39.7 | 9.2 | 8.4 | Brown |
|  | Day 17 | 08:45 | 38.9 | 10.7 | 8.2 | Brown |
| Test 2 | Day 12 | 10:30 | 44.3 | 20.1 | 11.8 | Red |
|  | Day 12 | 12:00 | 46.3 | 7.3 | 9.8 | Brown |
|  | Day 12 | 18:15 | 46.3 | 7.3 | 9.0 | Brown |
|  | Day 13 | 08:30 | 44.6 | 6.7 | 9.8 | Brown |
|  | Day 13 | 17:25 | 44.7 | 7.7 | 9.2 | Brown |
|  | Day 14 | 08:15 | 43.7 | 8.8 | 8.6 | Brown |
|  | Day 14 | 19:15 | 49.3 | 8.1 | 9.2 | Brown |
|  | Day 15 | 08:05 | 46.0 | 10.5 | 9.5 | Brown |
|  | Day 15 | 17:20 | 49.5 | 10.5 | 10.3 | Brown |
|  | Day 17 | 08:45 | 48.7 | 15.8 | 10.2 | Red |
| Control 1 | Day 12 | 10:30 | 43.0 | 21.8 | 12.8 | Red |
|  | Day 12 | 12:00 | 43.6 | 18.8 | 12.2 | Red |
|  | Day 12 | 18:15 | 42.4 | 12.4 | 9.5 | Dull Red |
|  | Day 13 | 08:30 | 42.6 | 9.3 | 9.3 | Brown |
|  | Day 13 | 17:25 | 43.7 | 10.1 | 9.2 | Brown |
|  | Day 14 | 08:15 | 42.6 | 10.1 | 8.0 | Brown |
|  | Day 14 | 19:15 | 43.1 | 10.1 | 7.2 | Brown |
|  | Day 15 | 08:05 | 42.2 | 12.2 | 6.8 | Purple |
|  | Day 15 | 17:20 | 45.1 | 13.6 | 8.4 | Purple |
|  | Day 17 | 08:45 | 43.5 | 11.3 | 6.7 | Purple |

On Day 18, the meat from Sample 4 was removed from its package and cut in half. One half was repackaged as Test 4 in a multilayer barrier pouch with 17,500 ppm NaNO₂ in the sealant layer; the other half was repackaged as Control 2 in a multilayer barrier pouch. After repackaging, L*a*b* values were obtained for Test 4 and Control 2 at two times on Day 18 and one time on each of Day 19, 20, 21 and 25, as shown in Table 3.

TABLE 3

| Sample | Day | Time | L* | a* | b* | Observed Color |
|---|---|---|---|---|---|---|
| Test 4 | Day 18 | 15:00 | 49.6 | 8.3 | 11.3 | Brown |
|  | Day 18 | 16:30 | 50.2 | 6.6 | 11.9 | Brown |
|  | Day 19 | 17:00 | 49.2 | 14.4 | 11.6 | Dull Red |
|  | Day 20 | 08:45 | 45.7 | 17.8 | 11.4 | Red |
|  | Day 21 | 11:15 | 48.4 | 18.1 | 11.8 | Red |
|  | Day 25 | 08:40 | 45.4 | 20.1 | 10.6 | Red |
| Control 2 | Day 18 | 15:00 | 43.7 | 10.9 | 10.9 | Brown |
|  | Day 18 | 16:30 | 49.8 | 7.3 | 10.8 | Brown |
|  | Day 19 | 17:00 | 49.2 | 7.9 | 9.5 | Brown |
|  | Day 20 | 08:45 | 48.5 | 8.5 | 8.2 | Brown |
|  | Day 21 | 11:15 | 49.9 | 12.0 | 9.1 | Purple |
|  | Day 25 | 08:40 | 41.7 | 11.5 | 6.0 | Purple |

After the reading on Day 25, one additional L*a*b* value was obtained for each sample (Time 0 in Table 4). The meat from Test 4 and Control 2 was then removed from the packages and repackaged in identical PVC overwrap as Test 5 and Control 3. After repackaging, L*a*b* values were obtained for Test 5 and Control 3 at 11 times over the 31 hours following repackaging at Time 0, as shown in Table 4.

TABLE 4

| Sample | Time (hours) | L* | a* | b* | Observed Color |
|---|---|---|---|---|---|
| Test 5 | 0 | 41.6 | 16.9 | 8.1 | Red |
|  | 0.5 | 45.6 | 17.1 | 9.3 | Red |
|  | 1 | 44.5 | 17.9 | 9.9 | Red |
|  | 2 | 44.9 | 18.0 | 9.8 | Red |
|  | 3 | 45.1 | 17.6 | 9.9 | Red |
|  | 4 | 44.9 | 18.3 | 11.0 | Red |
|  | 5 | 44.6 | 18.3 | 11.1 | Red |
|  | 6 | 43.6 | 17.4 | 10.5 | Red |
|  | 7 | 43.5 | 18.5 | 11.1 | Red |
|  | 8 | 44.2 | 17.9 | 10.5 | Red |
|  | 9 | 46.2 | 15.6 | 9.6 | Red |
|  | 31 | 44.5 | 16.2 | 10.5 | Red |
| Control 3 | 0 | 44.9 | 12.0 | 6.9 | Purple |
|  | 0.5 | 45.3 | 21.2 | 13.9 | Red |
|  | 1 | 43.8 | 23.4 | 14.5 | Red |
|  | 2 | 45.1 | 22.5 | 13.9 | Red |
|  | 3 | 45.4 | 22.1 | 13.6 | Red |
|  | 4 | 46.2 | 22.4 | 14.7 | Red |
|  | 5 | 44.4 | 22.9 | 13.9 | Red |
|  | 6 | 45.3 | 21.5 | 12.8 | Red |
|  | 7 | 46.5 | 22.9 | 15.4 | Red |
|  | 8 | 45.0 | 22.1 | 13.7 | Red |
|  | 9 | 46.4 | 21.9 | 14.6 | Red |
|  | 31 | 44.0 | 20.2 | 12.3 | Red |

EXAMPLE 2

A large selection of beef was obtained from a beef processor. At the time of receipt, the beef was 7 days post mortem; and the day of receipt was designated as Day 7. On Day 7, three slices of beef were removed from the large section and packaged as Replicate 1, Replicate 2 and Replicate 3 in three separate multilayer barrier bags with 17,500 ppm NaNO$_2$ in the sealant layer. After repackaging, L*a*b* values were obtained for the three replicates on Day 7, 8, 9, 13 and 21, as shown in Table 5.

TABLE 5

| Sample | Day | L* | a* | b* | Observed Color |
|---|---|---|---|---|---|
| Replicate 1 | Day 7 | 36.3 | 16.1 | 8.1 | Red |
|  | Day 8 | 34.1 | 18.8 | 7.5 | Red |
|  | Day 9 | 35.0 | 22.7 | 8.6 | Red |
|  | Day 13 | 38.7 | 19.1 | 8.7 | Red |
|  | Day 21 | 37.9 | 21.4 | 8.4 | Red |
| Replicate 2 | Day 7 | 35.8 | 15.3 | 7.7 | Red |
|  | Day 8 | 41.2 | 14.7 | 8.3 | Dull Red |
|  | Day 9 | 40.4 | 18.4 | 8.6 | Red |
|  | Day 13 | 43.1 | 17.8 | 9.9 | Red |
|  | Day 21 | 42.9 | 18.1 | 8.9 | Red |
| Replicate 3 | Day 7 | 35.9 | 15.3 | 7.7 | Red |
|  | Day 8 | 34.8 | 14.8 | 7.7 | Dull Red |
|  | Day 9 | 35.4 | 20.6 | 8.8 | Red |
|  | Day 13 | 36.5 | 20.5 | 8.8 | Red |
|  | Day 21 | 35.3 | 19.3 | 8.9 | Red |

On Day 14, four additional slices of beef were removed from the large section of beef received on Day 7 and packaged as Replicate 4, Replicate 5, Replicate 6 and Replicate 7 in four separate multilayer barrier bags with 17,500 ppm NaNO$_2$ in the sealant layer. After repackaging, L*a*b* values were obtained for the three replicates on two times on Day 14 and one time on each of Day 15, 16, 17 and 21, as shown in Table 6.

TABLE 6

| Sample | Day | L* | a* | b* | Observed Color |
|---|---|---|---|---|---|
| Replicate 4 | Day 14 (12:00) | 36.8 | 15.2 | 7.8 | Red |
|  | Day 14 (17:30) | 35.0 | 11.3 | 6.4 | Brown |
|  | Day 15 | 34.8 | 11.6 | 6.0 | Brown |
|  | Day 16 | 34.3 | 13.0 | 5.8 | Dull Red |
|  | Day 17 | 36.8 | 18.6 | 8.9 | Red |
|  | Day 21 | 35.4 | 18.3 | 7.3 | Red |
| Replicate 5 | Day 14 (12:00) | 36.1 | 14.9 | 7.5 | Red |
|  | Day 14 (17:30) | 35.2 | 9.4 | 6.1 | Brown |
|  | Day 15 | 35.6 | 9.9 | 6.4 | Brown |
|  | Day 16 | 36.8 | 13.0 | 7.2 | Dull Red |
|  | Day 17 | 37.0 | 17.9 | 7.7 | Red |
|  | Day 21 | 35.2 | 18.0 | 7.2 | Red |
| Replicate 6 | Day 14 (12:00) | 35.9 | 14.2 | 7.9 | Red |
|  | Day 14 (17:30) | 36.1 | 10.7 | 6.6 | Brown |
|  | Day 15 | 36.1 | 10.1 | 6.8 | Brown |
|  | Day 16 | 34.5 | 14.5 | 6.4 | Dull Red |
|  | Day 17 | 36.0 | 17.2 | 6.9 | Red |
|  | Day 21 | 36.0 | 17.6 | 7.2 | Red |
| Replicate 7 | Day 14 (12:00) | 35.4 | 14.5 | 8.0 | Red |
|  | Day 14 (17:30) | 34.7 | 12.9 | 6.0 | Brown |
|  | Day 15 | 35.0 | 11.8 | 6.1 | Brown |
|  | Day 16 | 35.0 | 14.2 | 6.3 | Dull Red |
|  | Day 17 | 37.5 | 18.5 | 7.0 | Red |
|  | Day 21 | 34.8 | 19.4 | 7.4 | Red |

On Day 21, four additional slices of beef were removed from the large section of beef received on Day 7 and packaged as Replicate 8, Replicate 9, Replicate 10 and Replicate 11 in four separate multilayer barrier bags with 17,500 ppm NaNO$_2$ in the sealant layer. After repackaging, L*a*b* values were obtained for the three replicates on two times on Day 21 and one time on each of Day 22, 23 and 26, as shown in Table 7.

TABLE 7

| Sample | Day | L* | a* | b* | Observed Color |
|---|---|---|---|---|---|
| Replicate 8 | Day 21 (12:00) | 37.2 | 16.6 | 8.4 | Red |
|  | Day 21 (17:00) | 37.8 | 11.0 | 6.9 | Brown |
|  | Day 22 | 34.8 | 15.4 | 7.7 | Dull Red |
|  | Day 23 | 36.5 | 18.8 | 8.8 | Dull Red |
|  | Day 26 | 36.2 | 18.8 | 7.8 | Red |
| Replicate 9 | Day 21 (12:00) | 37.2 | 15.2 | 7.2 | Red |
|  | Day 21 (17:00) | 38.1 | 11.6 | 7.3 | Brown |
|  | Day 22 | 36.5 | 15.2 | 7.7 | Dull Red |
|  | Day 23 | 36.1 | 18.8 | 8.3 | Dull Red |
|  | Day 26 | 36.8 | 19.8 | 8.5 | Red |
| Replicate 10 | Day 21 (12:00) | 37.0 | 15.0 | 7.4 | Red |
|  | Day 21 (17:00) | 38.0 | 11.3 | 7.0 | Brown |
|  | Day 22 | 34.7 | 15.5 | 7.4 | Dull Red |
|  | Day 23 | 36.3 | 18.6 | 8.3 | Dull Red |
|  | Day 26 | 36.8 | 18.5 | 7.6 | Red |
| Replicate 11 | Day 21 (12:00) | 36.4 | 13.9 | 6.6 | Red |
|  | Day 21 (17:00) | 36.8 | 11.6 | 6.7 | Brown |
|  | Day 22 | 36.7 | 15.4 | 7.9 | Dull Red |
|  | Day 23 | 36.3 | 18.7 | 8.4 | Dull Red |
|  | Day 26 | 35.9 | 19.5 | 7.9 | Red |

On Day 42, one additional slice of beef was removed from the large section of beef received on Day 7 and packaged as Control 1 in PVC overwrap. Also on Day 42, the meat from Replicate 1, Replicate 4 and Replicate 8 was removed from the packages and repackaged in identical PVC overwrap as Test 1, Test 4 and Test 8. After the packaging of Control 1 and the repackaging of the replicates, L*a*b* values were obtained for Test 1, Test 4, Test 8 and Control 1 at the time of packaging/repackaging (Time 0) and at 9 times over the 24 hours following packaging/repackaging at Time 0, as shown in Table 8.

TABLE 8

| Sample | Time (hours) | L* | a* | b* | Observed Color |
|---|---|---|---|---|---|
| Test 1 | 0 | 38.1 | 21.4 | 8.6 | Red |
| | 0.5 | 42.1 | 20.4 | 9.3 | Red |
| | 1 | 43.3 | 16.9 | 7.5 | Red |
| | 2 | 44.3 | 15.5 | 8.5 | Dull Red |
| | 3 | 46.5 | 12.3 | 7.8 | Brown |
| | 4 | 39.0 | 12.7 | 8.4 | Brown |
| | 5 | 42.7 | 11.5 | 8.0 | Brown |
| | 6 | 44.9 | 11.9 | 10.4 | Brown |
| | 7 | 46.0 | 10.9 | 9.5 | Brown |
| | 24 | 44.3 | 11.0 | 10.0 | Brown |
| Test 4 | 0 | 35.6 | 21.2 | 8.3 | Red |
| | 0.5 | 35.6 | 26.1 | 11.5 | Red |
| | 1 | 36.4 | 25.6 | 11.4 | Red |
| | 2 | 42.3 | 16.6 | 6.9 | Dull Red |
| | 3 | 42.0 | 14.2 | 6.2 | Dull Red |
| | 4 | 40.7 | 14.7 | 6.8 | Dull Red |
| | 5 | 41.1 | 14.7 | 9.5 | Dull Red |
| | 6 | 42.8 | 13.6 | 5.9 | Dull Red |
| | 7 | 36.7 | 16.8 | 8.3 | Dull Red |
| | 24 | 38.1 | 16.0 | 8.3 | Dull Red |
| Test 8 | 0 | 40.4 | 19.2 | 8.2 | Red |
| | 0.5 | 46.1 | 20.6 | 10.9 | Red |
| | 1 | 40.9 | 23.6 | 11.5 | Red |
| | 2 | 46.0 | 16.6 | 11.3 | Dull Red |
| | 3 | 42.3 | 14.2 | 7.5 | Dull Red |
| | 4 | 40.2 | 17.9 | 8.6 | Dull Red |
| | 5 | 41.9 | 17.4 | 9.9 | Dull Red |
| | 6 | 38.3 | 18.9 | 9.2 | Dull Red |
| | 7 | 39.1 | 17.8 | 8.5 | Dull Red |
| | 24 | 40.5 | 17.7 | 10.6 | Dull Red |
| Control 1 | 0 | 36.3 | 21.4 | 8.6 | Red |
| | 0.5 | 44.2 | 20.7 | 10.5 | Red |
| | 1 | 44.7 | 25.4 | 14.6 | Red |
| | 2 | 43.5 | 28.6 | 16.5 | Red |
| | 3 | 44.0 | 26.2 | 15.1 | Red |
| | 4 | 44.3 | 26.5 | 14.3 | Red |
| | 5 | 45.5 | 24.1 | 13.3 | Red |
| | 6 | 39.8 | 24.5 | 12.0 | Red |
| | 7 | 39.7 | 25.1 | 12.5 | Red |
| | 24 | 41.5 | 25.1 | 13.4 | Red |

EXAMPLE 3

Six samples of fresh pork were packaged in various barrier films. Control 1 was fresh pork packaged in a barrier film; Test 79 was fresh pork packaged in a barrier film with 2,500 ppm NaNO$_2$ in the sealant layer; Test 80 was fresh pork packaged in a barrier film with 5,000 ppm NaNO$_2$ in the sealant layer, wherein the NaNO$_2$ had an average particle size of 1 micron; Test 81 was fresh pork packaged in a barrier film with 5,000 ppm NaNO$_2$ in the sealant layer, wherein the NaNO$_2$ had an average particle size of 10 microns; Test 82 was fresh pork packaged in a barrier film with 17,500 ppm NaNO$_2$ in the sealant layer; and Test 26 was fresh pork packaged in a barrier film with 12,500 ppm NaNO$_2$ in the sealant layer. After packaging, L*a*b* values were obtained for the six samples at Day 1, 2, 3, 10, 17, 24, 34 and 45 as shown in Table 9.

TABLE 9

| Sample | Day | L* | a* | b* | Observed Color |
|---|---|---|---|---|---|
| Test 79 | Day 1 | 55.3 | 6.3 | 6.7 | Pink |
| | Day 2 | 55.1 | 6.6 | 6.8 | Pink |
| | Day 3 | 56.1 | 6.8 | 7.0 | Pink |
| | Day 10 | 57.3 | 7.2 | 8.4 | Pink |
| | Day 17 | 57.1 | 7.0 | 8.8 | Pink |
| | Day 24 | 57.2 | 6.8 | 8.6 | Pink |
| | Day 34 | 57.4 | 7.1 | 8.7 | Pink |
| | Day 45 | 57.4 | 5.6 | 5.9 | Dull Pink |
| Test 80 | Day 1 | 61.1 | 8.9 | 9.3 | Pink |
| | Day 2 | 61.2 | 8.6 | 8.8 | Pink |
| | Day 3 | 61.7 | 8.5 | 8.9 | Pink |
| | Day 10 | 61.5 | 8.3 | 10.8 | Pink |
| | Day 17 | 61.9 | 8.5 | 10.5 | Pink |
| | Day 24 | 61.8 | 8.5 | 10.1 | Pink |
| | Day 34 | 61.7 | 8.4 | 10.7 | Pink |
| | Day 45 | 57.7 | 9.9 | 7.5 | Pink |
| Test 81 | Day1 | 52.3 | 7.3 | 7.4 | Pink |
| | Day 2 | 53.4 | 7.6 | 7.5 | Pink |
| | Day 3 | 53.9 | 7.6 | 7.9 | Pink |
| | Day 10 | 57.3 | 8.6 | 8.1 | Pink |
| | Day 17 | 57.4 | 8.8 | 8.4 | Pink |
| | Day 24 | 57.1 | 8.9 | 8.7 | Pink |
| | Day 34 | 57.4 | 8.7 | 8.6 | Pink |
| | Day 45 | 54.6 | 9.9 | 6.3 | Pink |
| Test 82 | Day 1 | 60.3 | 7.8 | 8.1 | Pink |
| | Day 2 | 60.1 | 8.0 | 8.0 | Pink |
| | Day 3 | 60.2 | 8.0 | 7.7 | Pink |
| | Day 10 | 58.3 | 8.5 | no reading | Pink |
| | Day 17 | 58.3 | 8.4 | no reading | Pink |
| | Day 24 | Sample leaking and removed from test | | | |
| Test 26 | Day 1 | 59.6 | 7.2 | 7.9 | Pink |
| | Day 2 | 59.5 | 8.4 | 7.7 | Pink |
| | Day 3 | 59.8 | 9.0 | 7.5 | Pink |
| | Day 10 | 57.4 | 12.0 | 7.0 | Highly Pink |
| | Day 17 | 57.5 | 12.9 | 7.0 | Highly Pink |
| | Day 24 | 57.2 | 13.3 | 7.1 | Highly Pink |
| | Day 34 | 57.5 | 13.2 | 6.9 | Highly Pink |
| | Day 45 | 59.7 | 13.0 | 8.1 | Highly Pink |
| Control 1 | Day 1 | 57.6 | 6.1 | 7.8 | Pink |
| | Day 2 | 57.6 | 6.1 | 6.9 | Pink |
| | Day 3 | 55.6 | 5.9 | 7.0 | Pink |
| | Day 10 | 60.1 | 5.7 | 8.0 | Tan |
| | Day 17 | 60.4 | 5.9 | 8.0 | Tan |
| | Day 24 | 59.9 | 5.8 | 7.9 | Tan |
| | Day 34 | 60.9 | 6.2 | 8.1 | Tan |
| | Day 45 | 57.7 | 7.0 | 8.0 | Tan |

EXAMPLE 4

Six samples of fresh pork were packaged in various barrier films. Test 121A was fresh pork packaged in a barrier film with 17,500 ppm NaNO$_2$ in layer adjacent the sealant layer, wherein the sealant layer was 3 pounds per ream; Test 121 B, a replicate of Test 121A, was fresh pork packaged in a barrier film with 17,500 ppm NaNO$_2$ in layer adjacent the sealant layer, wherein the sealant layer was 3 pounds per ream; Test 120 was fresh pork packaged in a barrier film with 17,500 ppm NaNO$_2$ in the layer adjacent the sealant layer, wherein the sealant layer was 1.5 pounds per ream; Test 3308 was fresh pork packaged in a one-year-old barrier film with 12,500 ppm NaNO$_2$ in the sealant layer; Test 125 was fresh pork packaged in a one-year-old shrink barrier film with 12,500 ppm NaNO$_2$ in the sealant layer; and Test 22 was fresh pork packaged in a one-year-old shrink barrier film with 22,000 ppm NaNO$_2$ in the sealant layer. After packaging, L*a*b* values were obtained for the six samples at Day 1, 2, 9 and 14 as shown in Table 10.

TABLE 10

| Sample | Day | L* | a* | b* | Observed Color |
|---|---|---|---|---|---|
| Test 121A | Day 1 | 58.0 | 7.9 | 8.5 | Pink |
| | Day 2 | 58.6 | 9.2 | 8.3 | Pink |
| | Day 9 | 56.3 | 11.4 | 6.7 | Pink |
| | Day 14 | 49.5 | 12.1 | 7.3 | Pink |
| Test 121B | Day 1 | 55.3 | 7.4 | 8.1 | Pink |

TABLE 10-continued

| Sample | Day | L* | a* | b* | Observed Color |
|---|---|---|---|---|---|
| | Day 2 | 54.0 | 10.0 | 7.9 | Pink |
| | Day 9 | 56.1 | 11.4 | 7.0 | Pink |
| | Day 14 | 53.0 | 12.8 | 7.1 | Pink |
| Test 120 | Day 1 | 51.1 | 8.4 | 8.0 | Pink |
| | Day 2 | 49.8 | 10.8 | 9.3 | Pink |
| | Day 9 | 52.1 | 13.3 | 7.8 | Pink |
| | Day 14 | 51.6 | 15.1 | 7.0 | Pink |
| Test 3308 | Day 1 | 53.6 | 7.8 | 7.6 | Pink |
| | Day 2 | 54.4 | 9.0 | 6.3 | Pink |
| | Day 9 | 54.7 | 9.8 | 5.0 | Pink |
| | Day 14 | 50.1 | 10.9 | 5.7 | Pink |
| Test 125 | Day 1 | 59.2 | 6.9 | 8.3 | Pink |
| | Day 2 | 58.3 | 9.1 | 9.8 | Pink |
| | Day 9 | 54.8 | 11.6 | 7.6 | Pink |
| | Day 14 | 55.8 | 13.9 | 7.7 | Pink |
| Test 22 | Day 1 | 58.0 | 8.4 | 7.9 | Pink |
| | Day 2 | 57.4 | 10.9 | 7.6 | Pink |
| | Day 9 | 57.4 | 12.0 | 7.7 | Pink |
| | Day 14 | 58.4 | 11.1 | 7.7 | Pink |

One skilled in the art will conceive many modifications and other embodiments of the present invention from the benefit of the teachings disclosed herein. It is to be understood that the present invention includes the embodiments disclosed above but is not limited to the specific embodiments disclosed and that modifications and other embodiments will be apparent to those skilled the art from the disclosure and these modifications and embodiments are intended to be included within the scope of the claims.

What is claimed is:

1. A method for commercializing a fresh meat product comprising a fresh beef, fresh pork, or fresh poultry product having a water content of at least 5 percent by weight and a sodium chloride content of less than 1 percent by weight comprising:
    (a) butchering a slaughtered animal into a plurality of retail cuts;
    (b) packaging the retail cuts into a plurality of articles wherein each article comprises a polymeric oxygen barrier film having a transparent portion in contact with at least a portion of the fresh meat product and having a myoglobin blooming agent selected from nitric oxide donating compounds, wherein the nitric oxide donating compounds comprise Fremy's salt, nitrate salts having the formula $MNO_3$, nitrite salts having the formula $MNO_2$ or combinations thereof, wherein the counter ion M+ is selected from the group consisting of alkali metals, alkaline earth metals, transition metals, protonated primary, secondary or tertiary amines, quatemary amines and ammonium;
    (c) transporting the packaged articles to a retail outlet, wherein the packaged article is adapted for retail display and sale without removing the polymeric film and wherein the fresh meat product has a color with an "a*" value of at least about 15 for the fresh beef product or of at least about 6 for the fresh pork or fresh poultry product and the color is maintained for at least five days after display.

2. A method as in claim 1 wherein the fresh meat product comprises a fresh beef product and the fresh beef product has a color with an "a*" value of at least about 15.

3. A method as in claim 1 wherein the fresh meat product comprises a fresh pork product and the fresh pork product has a color with an "a*" value of at least about 6.

4. A method as in claim 1 wherein the fresh meat product comprises a fresh poultry product and the fresh poultry product has a color with an "a*" value of at least about 6.

5. A method as in claim 1 wherein the polymeric film comprises a multilayer film having a food contact layer and an oxygen barrier layer.

6. A method as in claim 5 wherein the food contact layer comprises polyolefin, polyester, polyamide, polystyrene, ionomer, polyacrylonitrile, or blends thereof.

7. A method as in claim 5 wherein the oxygen barrier layer comprises PVDC, EVOH, polyamide, polyester PVOH, nanocomposite, metal, metallized film, metal-oxide coated film, polyacrylonitrile, methyl acrylate copolymer or combinations thereof.

8. A method as in claim 1 wherein the myoglobin blooming agent is on, in or able to migrate to the transparent portion of the polymeric film in contact with the portion of the fresh meat product.

9. A method as in claim 8 wherein the transparent portion comprises between about 0.01 to about 10 µmole myoglobin blooming agent per square inch of the transparent portion.

10. A method as in claim 1 wherein the transparent portion comprises an amount of myoglobin blooming agent sufficient to cause the surface of the fresh meat product to have a visible red hue at least 10 days after packaging the fresh meat product in a vacuum environment.

11. A method as in claim 1 wherein the packaging step further comprises reducing oxygen from an environment surrounding the fresh meat product.

12. A method as in claim 11 wherein reducing oxygen is by vacuum to produce a vacuum package.

13. A method as in claim 5 wherein the packaged article is adapted for retail display and sale without removing the oxygen barrier layer of the polymeric film.

14. A method as in claim 1 wherein the food packaging article further comprises indicia.

15. A method as in claim 14 wherein the indicia is selected from the group consisting of a packed on date a sell by date, a use by date and combinations thereof.

16. A method as in claim 14 wherein the indicia comprises a sell by date which is at least about 20 days following the date of packaging.

17. A method as in claim 16 wherein the sell by date is at least about 30 days following the date of packaging.

18. A method as in claim 1 wherein transporting is in a refrigerated environment.

19. A method as in claim 1 comprising the additional step of slaughtering an animal.

* * * * *